United States Patent
Kristensson et al.

(10) Patent No.: US 12,046,166 B2
(45) Date of Patent: Jul. 23, 2024

(54) SUPPLY OF MULTI-LAYER EXTENDED REALITY IMAGES TO A USER

(71) Applicant: Telefonaktiebolaget LM Ericsson (publ), Stockholm (SE)

(72) Inventors: Andreas Kristensson, Södra Sandby (SE); Alexander Hunt, Tygelsjö (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 145 days.

(21) Appl. No.: 17/765,351

(22) PCT Filed: Nov. 26, 2019

(86) PCT No.: PCT/SE2019/051199
§ 371 (c)(1),
(2) Date: Mar. 30, 2022

(87) PCT Pub. No.: WO2021/107828
PCT Pub. Date: Jun. 3, 2021

(65) Prior Publication Data
US 2022/0343816 A1 Oct. 27, 2022

(51) Int. Cl.
*G09G 3/00* (2006.01)
*F21V 8/00* (2006.01)
*G02B 27/01* (2006.01)

(52) U.S. Cl.
CPC .......... *G09G 3/003* (2013.01); *G02B 6/0028* (2013.01); *G02B 6/0031* (2013.01); *G02B 27/0172* (2013.01); *G02B 2027/0178* (2013.01)

(58) Field of Classification Search
CPC ............. G09G 3/003; G09G 2300/023; G09G 2340/12; G09G 5/377; G02B 6/0028;
(Continued)

(56) References Cited

U.S. PATENT DOCUMENTS

| 4,735,473 A | 4/1988 | Migozzi et al. |
| 8,717,348 B2 | 5/2014 | Basile et al. |

(Continued)

FOREIGN PATENT DOCUMENTS

| CN | 101078886 A | 11/2007 |
| EP | 3492962 A2 | 6/2019 |

(Continued)

OTHER PUBLICATIONS

PCT International Search Report, mailed Aug. 28, 2020, in connection with International Application No. PCT/SE2019/051199, all pages.

(Continued)

*Primary Examiner* — William Lu
(74) *Attorney, Agent, or Firm* — Leffler Intellectual Property Law, PLLC; Kenneth B. Leffler

(57) ABSTRACT

An apparatus that supplies multi-plane images for viewing by a user includes an image generator, an image director, and a first output port. The image generator generates a first image to be seen by the user as being a first distance from a user point of view, and a second image to be seen by the user as being a second distance from the user point of view The first image is comprised of a number of optical wavelength components, and the second image is comprised of the number of optical wavelength components. The image director is configured to direct the first image to traverse a first optical path to the first output port of the apparatus, and to direct the second image to traverse a second optical path to the first output port of the apparatus. The first optical path corresponds to the first distance and the second optical path corresponds to the second distance. The first optical path and the second optical path have different lengths. The first output port is configured to connect to a first optical wave- (Continued)

guide that is configured to guide the number of optical wavelength components to a user display device.

14 Claims, 23 Drawing Sheets

(58) Field of Classification Search
CPC .............. G02B 6/0031; G02B 27/0172; G02B 2027/0178; G02B 26/0833; G02B 30/24; G02B 2027/0134; G02B 2027/014; H04N 13/395; H04N 13/332
See application file for complete search history.

(56) References Cited

U.S. PATENT DOCUMENTS

| | | | |
|---|---|---|---|
| 9,989,764 B2* | 6/2018 | Alexander | ............. G02B 26/10 |
| 10,571,693 B2* | 2/2020 | Tinch | ................ G02B 27/0172 |
| 2006/0228070 A1* | 10/2006 | Davis | ................ G02B 6/29383 385/20 |
| 2006/0250696 A1* | 11/2006 | McGuire | ............. G02B 27/149 359/630 |
| 2008/0088937 A1 | 4/2008 | Tang | |
| 2011/0199402 A1 | 8/2011 | Ishii et al. | |
| 2011/0199582 A1* | 8/2011 | Kuriki | ................ H04N 9/3129 353/31 |
| 2011/0221747 A1* | 9/2011 | Kim | ................... H04N 13/359 345/419 |
| 2013/0050697 A1* | 2/2013 | Colbourne | ............ G01J 3/027 359/615 |
| 2015/0205126 A1* | 7/2015 | Schowengerdt | .......... G02F 1/31 345/633 |
| 2015/0277123 A1 | 10/2015 | Chaum et al. | |
| 2016/0026253 A1 | 1/2016 | Bradski et al. | |
| 2016/0033771 A1 | 2/2016 | Tremblay et al. | |
| 2016/0124230 A1 | 5/2016 | Hino et al. | |
| 2016/0127722 A1* | 5/2016 | Ledentsov | ........... H04N 13/322 348/51 |
| 2016/0313556 A1 | 10/2016 | Futterer | |
| 2016/0363770 A1* | 12/2016 | Kim | ................... G02B 27/0093 |
| 2017/0075074 A1* | 3/2017 | Zhang | ................... G02B 6/352 |
| 2017/0255016 A1* | 9/2017 | Tinch | ................ G02B 27/0172 |
| 2018/0053284 A1 | 2/2018 | Rodriguez et al. | |
| 2018/0120559 A1* | 5/2018 | Yeoh | .................... G02B 26/105 |
| 2018/0196274 A1* | 7/2018 | Seo | ..................... G02B 27/022 |
| 2018/0231784 A1 | 8/2018 | Koudsi et al. | |
| 2018/0253931 A1* | 9/2018 | Maddox | ............... H04N 13/315 |
| 2018/0275410 A1* | 9/2018 | Yeoh | .................... H04N 13/344 |
| 2018/0356637 A1 | 12/2018 | Hu | |
| 2019/0004325 A1 | 1/2019 | Connor | |
| 2019/0064526 A1 | 2/2019 | Connor | |
| 2019/0098267 A1 | 3/2019 | Poon et al. | |
| 2019/0220002 A1* | 7/2019 | Huang | ...................... G06T 7/70 |
| 2019/0339524 A1* | 11/2019 | Wang | ................. G02B 27/0172 |
| 2020/0252602 A1* | 8/2020 | Oonishi | ............... H04N 13/117 |
| 2021/0181508 A1* | 6/2021 | Tu | ....................... G02B 27/0172 |
| 2021/0218940 A1* | 7/2021 | Xiao | ....................... G02B 30/52 |
| 2022/0179214 A1* | 6/2022 | Lee | ..................... G02B 27/0093 |
| 2023/0103091 A1* | 3/2023 | Held | ........................ G09G 3/001 345/630 |

FOREIGN PATENT DOCUMENTS

| | | |
|---|---|---|
| JP | 2012233958 A | 11/2012 |
| JP | 2018510379 A | 4/2018 |
| KR | 20180100645 A | 9/2018 |
| KR | 20190106900 A | 9/2019 |
| WO | 2006110009 A1 | 10/2006 |
| WO | 2013188464 A1 | 12/2013 |
| WO | 2017209829 A2 | 12/2017 |
| WO | 2018138714 A1 | 8/2018 |
| WO | 2018164914 A2 | 9/2018 |
| WO | 2019135165 A2 | 7/2019 |

OTHER PUBLICATIONS

PCT Written Opinion, mailed Aug. 28, 2020, in connection with International Application No. PCT/SE2019/051199, all pages.
Grayson, Chris, "Holographic Waveguides: What You Need to Know to Understand Smartglasses Market", May 4, 2017, https://uploadvr.com/waveguides-smartglasses/, 16 pages.
Otto, Laura, "Novel optical fibers transmit high-quality images", UWM Report, Feb. 25, 2014, https://uwm.edu/news/novel-optical-fibers-transmit-high-quality-images-2/, captured Dec. 2, 2019, 3 pages.
Unknown, "Magic Leap One", Creator Edition, https://www.magicleap.com/magic-leap-one, capture Dec. 2, 2019, 11 pages.
India Office Action issued Sep. 16, 2022 in connection with India Application No. 202217027456, 6 pages.
European Communication and Search Report issued Oct. 10, 2023 in connection with European Application No. 19954446.1, 9 pages.
Chinese Office Action with Search Report, with English language translation, issued Mar. 19, 2024, in connection with Chinese Application No. 201980102580.6, 15 pages.

* cited by examiner

SUPPLY OF MULTI-LAYER EXTENDED REALITY IMAGES TO A USER

BACKGROUND

The present invention relates to extended reality technology, and more particularly to technology that presents multi-layer extended reality images to a user.

It is expected that extended reality (XR) systems will soon become a common way for people to receive and interact with all sorts of digital information. Extended reality (XR) systems (such as e.g., augmented reality (AR) and mixed reality (MR) systems) can be used to bridge the gap between physical and digital worlds, augmenting and projecting digital information into the physical world.

A head mounted display (HMD) is one possible device implementation in an XR system. Conventional XR glasses rely on computing power and light sources (e.g., LED, Laser, or other projecting technologies) that are integrated into the XR glasses, and this makes them heavy and bulky. There is therefore a need to find solutions that allow XR glasses to be smaller, less visible, and smarter, and that provide for an improved user experience.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) that supplies multi-plane images for viewing by a user. The technology includes an image generator, an image director, and a first output port. The image generator generates a first image to be seen by the user as being a first distance from a user point of view, and a second image to be seen by the user as being a second distance from the user point of view. The first image is comprised of a number of optical wavelength components, and the second image is comprised of the number of optical wavelength components. The image director directs the first image to traverse a first optical path to the first output port of the apparatus, and directs the second image to traverse a second optical path to the first output port of the apparatus, wherein the first optical path corresponds to the first distance and the second optical path corresponds to the second distance, and wherein the first optical path and the second optical path have different lengths. The first output port connects to a first optical waveguide that is configured to guide the number of optical wavelength components to a user display device.

In another aspect of some embodiments, the technology further includes the first optical waveguide coupled at a first end to the first output port; and a see-through optical waveguide coupled to a second end of the first optical waveguide.

In another aspect of some embodiments, the image director comprises a first electro-mechanical mirror array located in the path of the first and second images supplied by the image generator; and a controller. The controller causes the first electro-mechanical mirror array to direct the first image to the first optical path, and causes the first electro-mechanical mirror array to direct the second image to the second optical path.

In another aspect of some embodiments, the image generator time multiplexes generation of the first and second images. When the image generator is generating the first image, the controller causes the first electro-mechanical mirror array to direct the first image to the first optical path; and when the image generator is generating the second image, the controller causes the first electro-mechanical mirror array to direct the second image to the second optical path.

In another aspect of some embodiments, the image generator simultaneously generates the first image and the second image as component parts of an overall image, wherein the first image is located within a first part of the overall image and the second image is located within a second part of the overall image; the first electro-mechanical mirror array has a first area part and a second area part; the first electro-mechanical mirror array is disposed within the apparatus such that the first area part of the first electro-mechanical mirror array is in the path of the first image output by the image generator and the second area part of the first electro-mechanical mirror array is in the path of the second image output by the image generator. The controller causes the first area part of the first electro-mechanical mirror array to direct the first image to the first optical path; and causes the second area part of the first electro-mechanical mirror array to direct the second image to the second optical path.

In another aspect of some embodiments, the first and second images are configured for viewing by a first eye of the user; the image generator generates a third image to be seen by the user as being the first distance from the user point of view, and a fourth image to be seen by the user as being the second distance from the user point of view, wherein the third image is comprised of the number of optical wavelength components, and the second image is comprised of the number of optical wavelength components, and wherein the third and fourth images are configured for viewing by a second eye of the user. The image generator simultaneously generates the first image, the second image, the third image, and the fourth image as component parts of the overall image, wherein the third image is located within a third part of the overall image and the fourth image is located within a fourth part of the overall image. Also in such embodiments, the first electro-mechanical mirror array has a third area part and a fourth area part; the first electro-mechanical mirror array is disposed within the apparatus such that the third area part of the first electro-mechanical mirror array is in the path of the third image output by the image generator, and the fourth area part of the first electro-mechanical mirror array is in the path of the fourth image output by the image generator. In such embodiments, the controller causes the third area part of the first electro-mechanical mirror array to direct the third image to a third optical path that corresponds to the first distance; and causes the fourth area part of the first electro-mechanical mirror array to direct the fourth image to a fourth optical path that corresponds to the second distance, wherein:

the first electro-mechanical mirror array is configured to direct the first image to the first output port via the first optical path, and to direct the third image to a second output port via the third optical path, wherein the second output port is configured to connect to a second optical waveguide that is configured to guide the number of optical wavelength components to the user display device; and the technology further comprises a second electro-mechanical mirror array configured to direct the second image to the first output port via the second optical path, and to direct the fourth image to the second output port via the fourth optical path.

In another aspect of some embodiments, the first and second images are configured for viewing by a first eye of the user; the image generator generates a third image to be seen by the user as being the first distance from the user point of view, and a fourth image to be seen by the user as being the second distance from the user point of view, wherein the third image is comprised of the number of optical wavelength components, and the fourth image is comprised of the number of optical wavelength components, and wherein the third and fourth images are configured for viewing by a second eye of the user; the image director receives the first image and the second image from the image generator during a first period of time; the image director receives the third image and the fourth image from the image generator during a second period of time; the image director is configured to direct the first image to the first output port via the first optical path during the first period of time; the image director is configured to direct the second image to the first output port via the second optical path during the first period of time; the image director is configured to direct the third image to a second output port via a third optical path during the second period of time, wherein the third optical path corresponds to the first distance; and the image director is configured to direct the fourth image to the second output port via a fourth optical path during the second period of time, wherein the fourth optical path corresponds to the second distance.

In another aspect of some embodiments, the first period of time comprises a third period of time and a fourth period of time; the second period of time comprises a fifth period of time and a sixth period of time. When it is the third period of time, the image director causes the first image to be directed to the first output port via the first optical path; when it is the fourth period of time, the image director causes the second image to be directed to the first output port via the second optical path; when it is the fifth period of time, the image director causes the third image to be directed to the second output port via the third optical path; and when it is the sixth period of time, the image director causes the fourth image to be directed to the second output port via the fourth optical path.

In another aspect of some embodiments, the image director comprises a second electro-mechanical mirror array, disposed in the second optical path and the fourth optical path, and configured to direct the second image to the first output port during the first period of time; and to direct the fourth image to the second output port during the second period of time.

In another aspect of some embodiments, the first and second images are configured for viewing by a first eye of the user; the image generator generates a third image to be seen by the user as being the first distance from the user point of view, and a fourth image to be seen by the user as being the second distance from the user point of view, wherein the third image is comprised of the number of optical wavelength components, and the fourth image is comprised of the number of optical wavelength components, and wherein the third and fourth images are configured for viewing by a second eye of the user; the image director receives the first image and the third image from the image generator during a first period of time; the image director receives the second image and the fourth image from the image generator during a second period of time; the image director is configured to direct the first image to the first output port via the first optical path during the first period of time; the image director is configured to direct the third image to a second output port via a third optical path during the first period of time, wherein the third optical path corresponds to the first distance; the image director is configured to direct the second image to the first output port via the second optical path during the second period of time, and to direct the fourth image to the second output port via a fourth optical path during the second period of time, wherein the fourth optical path corresponds to the second distance.

In another aspect of some embodiments, the first period of time comprises a third period of time and a fourth period of time and the second period of time comprises a fifth period of time and a sixth period of time. When it is the third period of time, the image director causes the first image to be directed to the first output port via the first optical path; when it is the fourth period of time, the image director causes the third image to be directed to the second output port via the third optical path; when it is the fifth period of time, the image director causes the second image to be directed to the first output port via the second optical path; and when it is the sixth period of time, the image director causes the fourth image to be directed to the second output port via the fourth optical path.

In another aspect of some embodiments, the image director comprises a second electro-mechanical mirror array, disposed in the second optical path and the fourth optical path. The image director is configured to direct the second image to the first output port during the first period of time; and to direct the fourth image to the second output port during the second period of time.

In another aspect of some embodiments, the technology further includes an autofocus lens arrangement that is dynamically controlled by the controller to cause the first distance to have a first optical length when a first control signal is generated, and to have a second optical length when a second control signal is generated, wherein the first and second optical lengths are different.

BRIEF DESCRIPTION OF THE DRAWINGS

The objects and advantages of the invention will be understood by reading the following detailed description in conjunction with the drawings in which.

DETAILED DESCRIPTION

Figure 1:
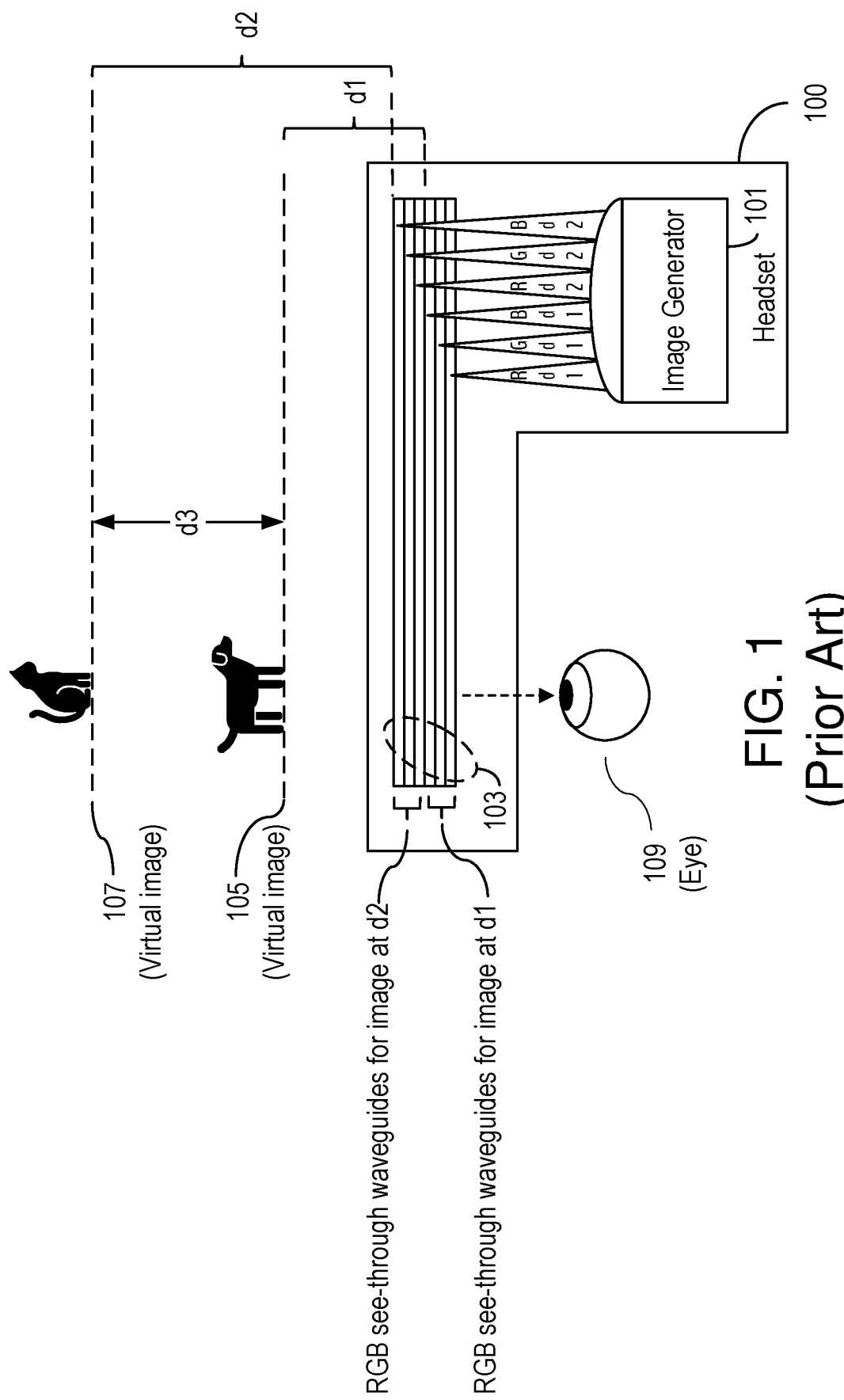
FIG. 1 depicts a conventional headset display.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

An aspect of the herein-described technology involves moving all scene rendering computing power and related hardware (such as LED light sources, LCOS, and lens packages) from the XR glasses to a separate XR computing device that, for example, could be placed in a pouch or worn on a belt. This separation can be achieved by inserting one or more fiber optics cables between the lens packages and the waveguides in the XR glasses.

To illustrate this aspect, reference is made to FIG. 1, which depicts a conventional headset display 100. The headset display 100 can be, for example, implemented as a pair of glasses or a helmet.

It is desired to display a first virtual image 105 and a second virtual image 107 in a manner such that the first image 105 is seen by the user as being a first distance d1 from a user point of view 109, and the second image 107 is seen by the user as being a second distance d2 from the user point of view 109. The first distance d1 and the second distance d2 may also be referred to herein as first and second virtual planes (VP). The two virtual planes are displaced from one another by a distance d3.

The first image 105 is comprised of a number (n) of optical wavelength components (e.g., in some but not necessarily all embodiments, three optical wavelengths corresponding to Red, Green, and Blue—RGB), and the second image 107 is comprised of the same number (n) of optical wavelength components. To achieve this, an image generator 101 in the headset 100 projects all of the optical wavelength components onto a corresponding set of see-through waveguides 103. In this example, since there are two virtual planes, and three optical wavelength components per plane, the image generator 101 projects a total of six optical wavelength components (Rd1, Gd1, Bd1, Rd2, Gd2, Bd2) onto the see-through waveguides 103, and this is done such that each of the optical wavelength components will be guided through a respective one of six see-through waveguides 103, three see-through waveguides for each virtual plane as shown in the figure.

The see-through waveguides 103 can be implemented as, for example, holographic waveguides, which are a type of display technology very often used in optical see-through AR to enable a small form factor design.

Figure 2:
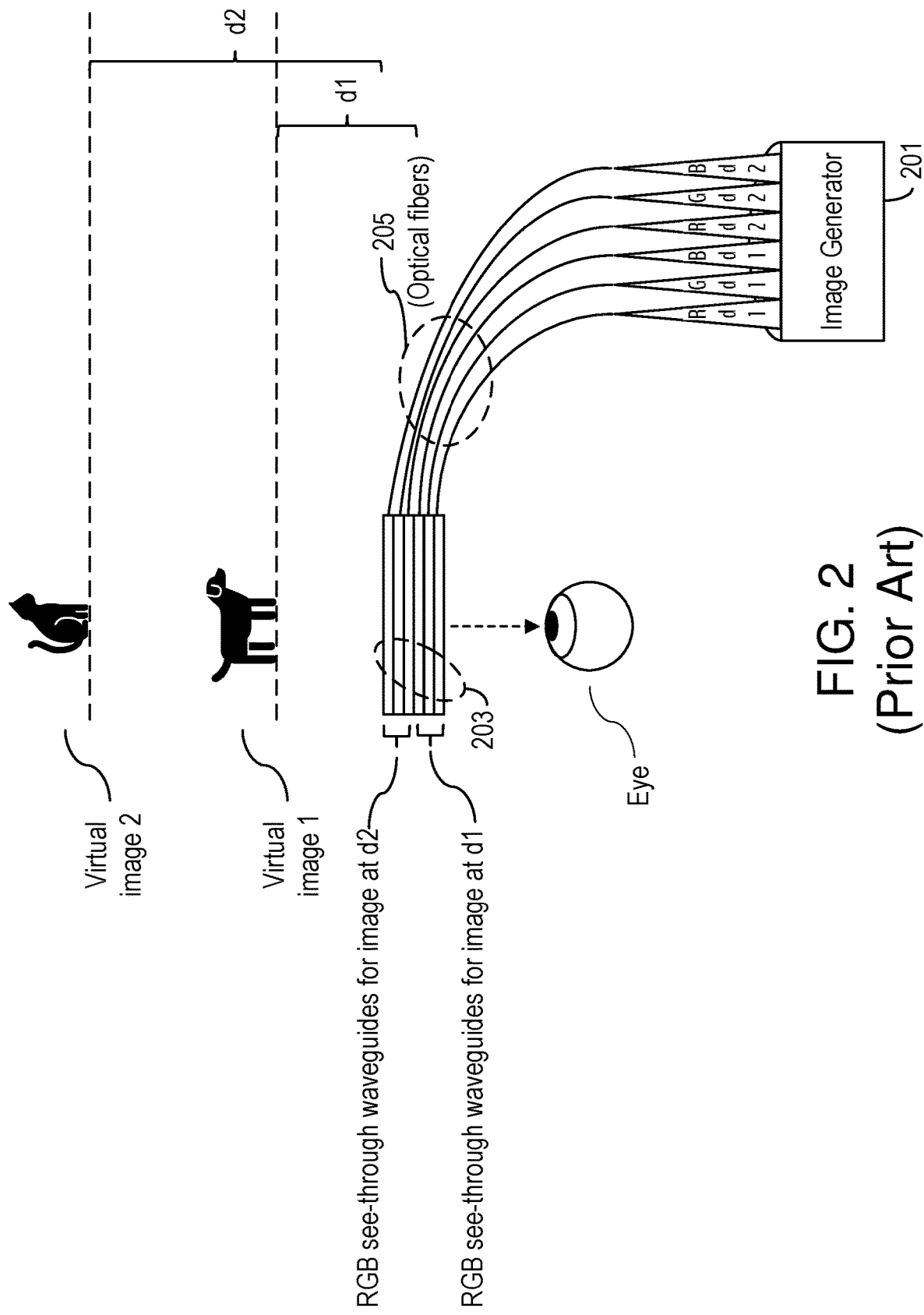
FIG. 2 depicts an arrangement in which the image generator is not integrated with the headset and is therefore separated from the see-through optical waveguides.

FIG. 2 shows an alternative arrangement still involving an image generator 201 and see-through waveguides 203, but in which the image generator 201 is no longer integrated with the headset and is therefore separated from the see-through optical waveguides 203. Because of this separation, the image generator 201 can no longer project the images directly onto the see-through waveguides 203. To solve this problem a bundle of optical fibers 205 (which are also a type of optical waveguide) is introduced.

Optical fiber provides a direct one to one image transfer mechanism. Typically there is a one-to-one correspondence between optical fibers and pixels in a complete image. The image can be enlarged with an optical lens system at some point before it enters the holographic waveguide if the image needs to be larger. However, enlarging an image in this way has the drawback of some pixilation (i.e., a kind of degradation in image quality due to an insufficient amount of pixel information for the enlarged image).

Optical fiber can be made very thin. There are optical fibers that have been made as small as 0.8 um. To be able to transfer a Full High Definition (FHD) image with, for example, 1 um thick optical fiber per pixel, the dimension of the fiber cable would be around ~6 mm×~3.3 mm ((1920 pixel resolution×3 sub pixels per pixel×1 um)×(1080 pixel resolution×3 sub pixels per pixel×1 um)), in other words, an area of ~19 mm². In an XR device with one display for each eye, two optical fiber cables with these dimensions would be needed.

It has been shown that it is possible to propagate multiple wavelengths of light through a single optical fiber. Therefore in embodiments utilizing such technology, the number of optical fibers used may be fewer than the number of optical wavelength components associated with a virtual plane since a single fiber can carry several wavelength components. But still, conventional technology requires that the number of optical fibers be replicated for each different virtual plane.

As shown in the figure, each optical fiber 205 receives a respective one of the optical wavelength components projected by the image generator 201, and guides this to a respective one of the see-through waveguides 203. It should be noted that the depiction of a one-to-one correspondence between fibers and wavelength components is made to ease the discussion. In practical embodiments, a same fiber can be used to carry some or all wavelength components associated with an image pixel (e.g., all three of the red, green, and blue wavelength components), with the projectors in such systems operating in a field sequential fashion such that, for example, a red part of the image is projected first, followed by a green part and then a blue part, and so on.

In the arrangement of FIG. 2, the display system of the image generator 201 can be the same set of hardware parts as in a waveguide AR headset. So, for example, it can comprise a Liquid Crystal On Silicon (LCOS) display with a light source or a micro Organic Light Emitting Diode (OLED) that will supply the image to the holographic waveguides. In addition to the image producing part, the optics to produce the distance to the virtual plane are also positioned here (but not shown in order to avoid cluttering the figure). A benefit of adding the optics in this part of the system (i.e., separate from the display device that the user looks through) is that one is no longer as constrained in space as when the optics are placed in, for example, the temples of the AR glasses. This means that the optical components can be made comparatively larger, which enables them to be able to manipulate light in a better/ simpler way. Optical properties that can easily be changed include virtual planes, image size, and image positions.

In particular, and as one example, having more room within which to install optical and other components means that the size and resolution of images can be increased compared to headset-bound technology. In one improvement, having a larger image size to work with enables different display surfaces to be used for different purposes. For example, in one aspect of the technology, a central part of the perceived image can be used for displaying images and a peripheral part (e.g., bottom part) can be used to display a status field.

By separating the host system (including image generator 201) from the surface that displays the image (e.g., see-through waveguides 203), the processing of all images that are to be shown on the see-through waveguides 203 can also be moved out of the head-mounted device. As a result, the head-mounted device does not need a battery or any other electrically driven parts to show an image to the user. This makes it possible to manufacture the head-mounted device in a very slim fashion compared to older technology.

The arrangements described so far can be further improved, and these improvements are now described in greater detail.

Figure 3:
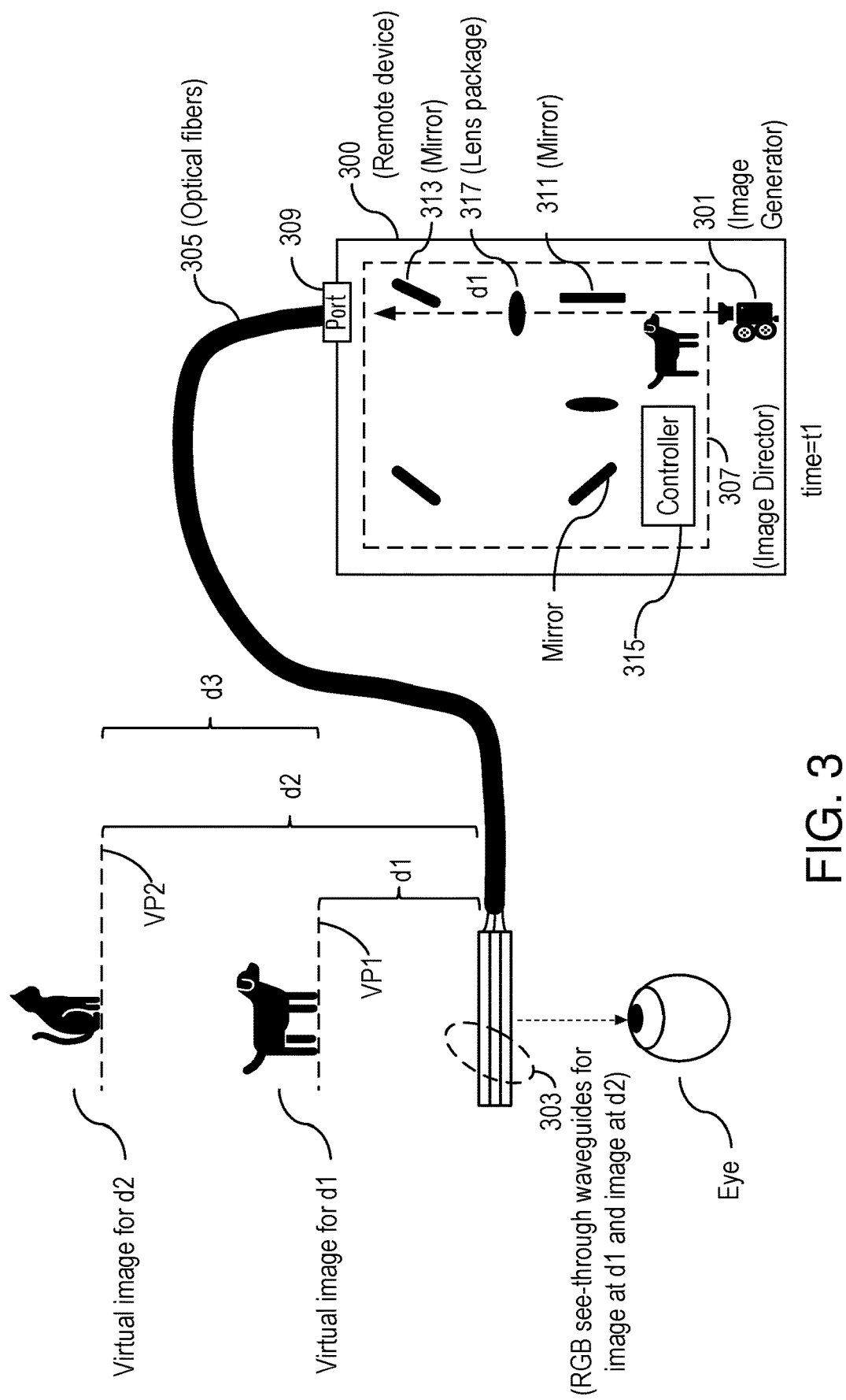
FIGS. 3, 4, and 5 depict arrangements of a remote device having an image generator that supplies images to see-through waveguides by means of suitable optical waveguides, and in which time multiplexing is used to display images situated on multiple virtual planes.

Referring now to FIG. 3, a remote device 300 having an image generator 301 supplies images to see-through waveguides 303 by means of suitable optical waveguides such as the illustrated bundle of optical fibers 305. Each image pixel comprises a number of optical wavelength components. For example, and without limitation each image pixel can comprise three optical wavelength components corresponding to read, green, and blue pixel information.

In an aspect of some but not necessarily all embodiments consistent with the invention, additional components are present in the remote device 300 that enable it to alter the optical path in a dynamic way. By doing this, the virtual distance of objects can be switched by dynamically changing the optical path inside the compute device. One benefit of doing this is that it eliminates the need to have a dedicated set of waveguide layers for each virtual plane to be depicted. For example, where FIG. 2 shows an embodiment requiring six optical fibers 205 and a corresponding set of six see-through waveguides 203 (i.e., three waveguide layers for the virtual image at distance d1, and three additional waveguide layers for the virtual image at distance d2), embodiments consistent with the invention require only enough waveguides to convey and depict the number of optical wavelength components associated with one image pixel, and these same waveguides are used by all of the virtual planes. A benefit of reducing the number of waveguide layers is that it enables the XR device to be made more cheaply and lighter with only one optical interface to the waveguide.

Accordingly, the remote device 300 further includes an image director 307 configured to direct different images to traverse respectively different optical paths within the remote device 300 before arriving at a first output port 309 of the remote device 300. For example, if a first image is to be made to appear at a first distance d1 from a user point of view and a second image is to be made to appear at a second distance d2 from the user point of view, then the image director 307 directs the first image to traverse a first optical path to the first output port 309 of the remote device 300, and directs the second image to traverse a second optical path to the first output port 309 of the remote device, wherein the first optical path corresponds to the first distance d1 and the second optical path corresponds to the second distance d2, wherein the first optical path and the second optical path have different lengths corresponding to the difference d3 between the distances d2 and d1.

This dynamic changing of optical paths inside the remote device 300 will be described further with reference to FIG. 3, FIG. 4, and FIG. 5. In this example, first and second images are to be depicted at respective first and second virtual planes. However, the depiction of only two virtual planes is for purposes of illustration only, and should not be construed as a limitation. To the contrary the principles upon which this technology is based are not limited to only two virtual planes, and more than two optical paths can be constructed in the remote device 300 which will enable more than two virtual planes.

Figure 5:
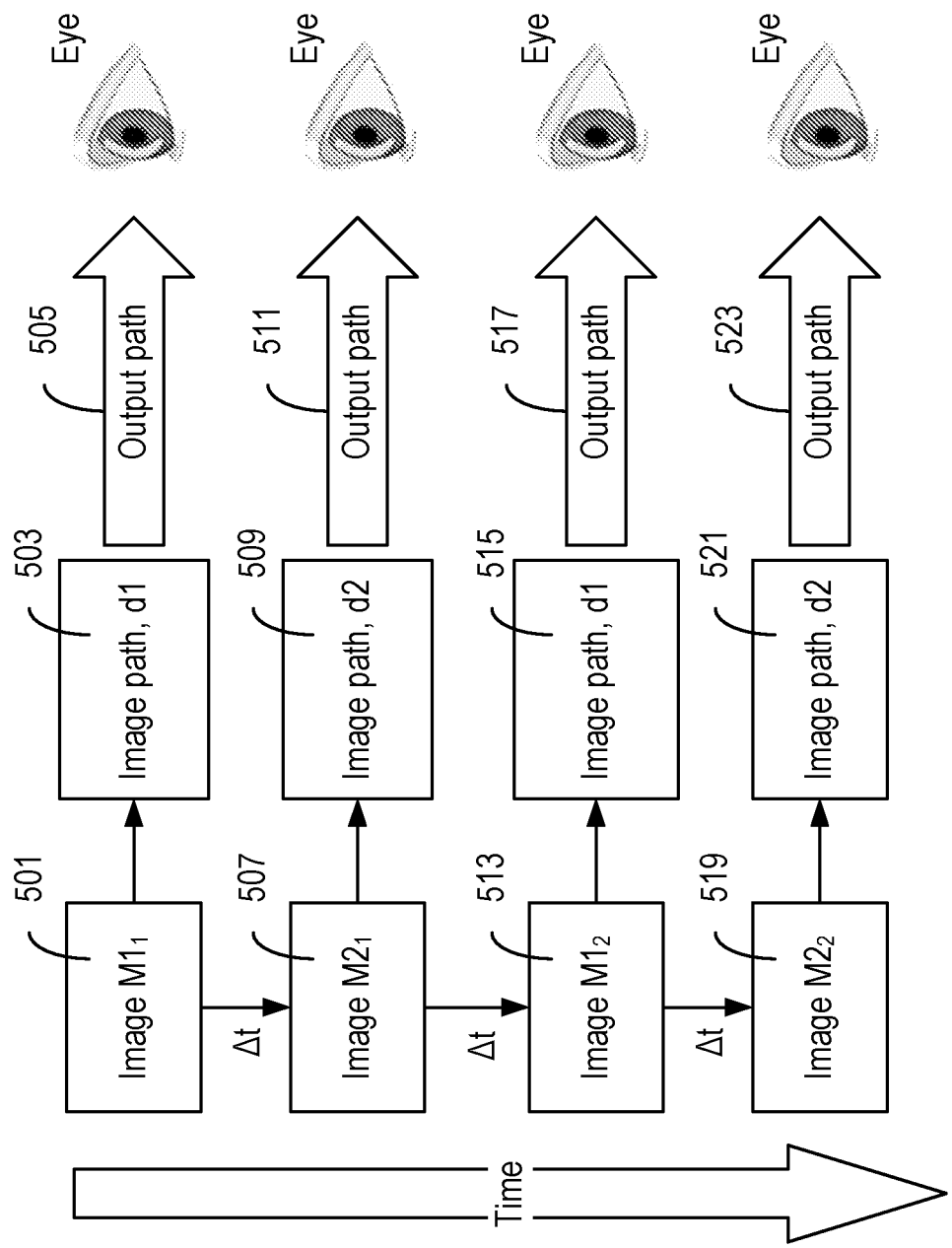

An aspect of some embodiments consistent with the invention is reliance on time multiplexing, as shown in FIG. 5. For the sake of simplicity, this example deals only with monoscopic renderings. Expansion of the principles to cover stereoscopic renderings of images is discussed later in this document.

As shown in the figure, the image director 307 receives (step 501), during a first period of time, a first image $M1_1$ to be perceived as being at a first distance d1 from a user point of view. The image director 307 therefore directs (step 503) the first image $M1_1$ to a first optical image path corresponding to the distance d1. The first image $M1_1$ emerges at the end of the first optical image path and is supplied to the first output port 309 of the remote device 300, from which it is then conveyed to the see-through waveguides 303 for viewing by the user (step 505).

Next, after a time Δt, the image director 307 receives (step 507), during a second period of time, a second image $M2_1$ to be perceived as being at a second distance d2 from the user point of view. The image director 307 therefore directs (step 509) the second image $M2_1$ to a second optical image path corresponding to the distance d2. The second image $M2_1$ emerges at the end of the second optical image path and is supplied to the first output port 309 of the remote device 300, from which it is then conveyed to the see-through waveguides 303 for viewing by the user (step 511).

It will be understood that the display of the first image $M1_1$ during the first period of time followed by the display of the second image $M2_1$ during the second period of time occur rapidly enough that the user does not perceive the switching, but instead perceives the two images as being displayed at the same time. This corresponds to one frame of a multi-plane image.

This process is repeated for subsequent frames as well. To illustrate this point, FIG. 5 also shows that the image director 307 receives (step 513), during a next first period of time, a next first image $M1_2$ to be perceived as being at the first distance d1 from the user point of view. The image director 307 therefore directs (step 515) the next first image $M1_2$ to the first optical image path corresponding to the distance d1. The next first image $M1_2$ emerges at the end of the first optical image path and is supplied to the first output port 309 of the remote device 300, from which it is then conveyed to the see-through waveguides 303 for viewing by the user (step 517).

Next, after another time Δt, the image director 307 receives (step 519), during a next second period of time, a next second image $M2_2$ to be perceived as being at the second distance d2 from the user point of view. The image director 307 therefore directs (step 521) the next second image $M2_2$ to the second optical image path corresponding to the distance d2. The next second image $M2_2$ emerges at the end of the second optical image path and is supplied to the first output port 309 of the remote device 300, from which it is then conveyed to the see-through waveguides 303 for viewing by the user (step 523).

In some but not necessarily all embodiments consistent with the invention, the image director 307 uses a controller to dynamically alter the positions of one or more electro-mechanical mirror arrays such that an image projected by an image generator will be caused to traverse one of a number of possible optical paths within the remote device 300. The electro-mechanical mirror arrays can for example be micro electro-mechanical mirrors (MEMS) as are known in the art.

To illustrate this point further, reference again is made to FIG. 3 which shows an image director 307 comprising a first mirror 311 and a second mirror 313, which are electro-mechanical mirrors as just mentioned. FIG. 3 depicts the arrangement at a first period of time t1. The controller 315 causes the first and second mirrors 311, 313 to position themselves such that an image generated by the image generator 301 will flow through a lens package 317 (for image focusing) directly to the first output port 309. The distance from the image generator 301 to the first output port 309 corresponds to the first optical path d1.

Figure 4:
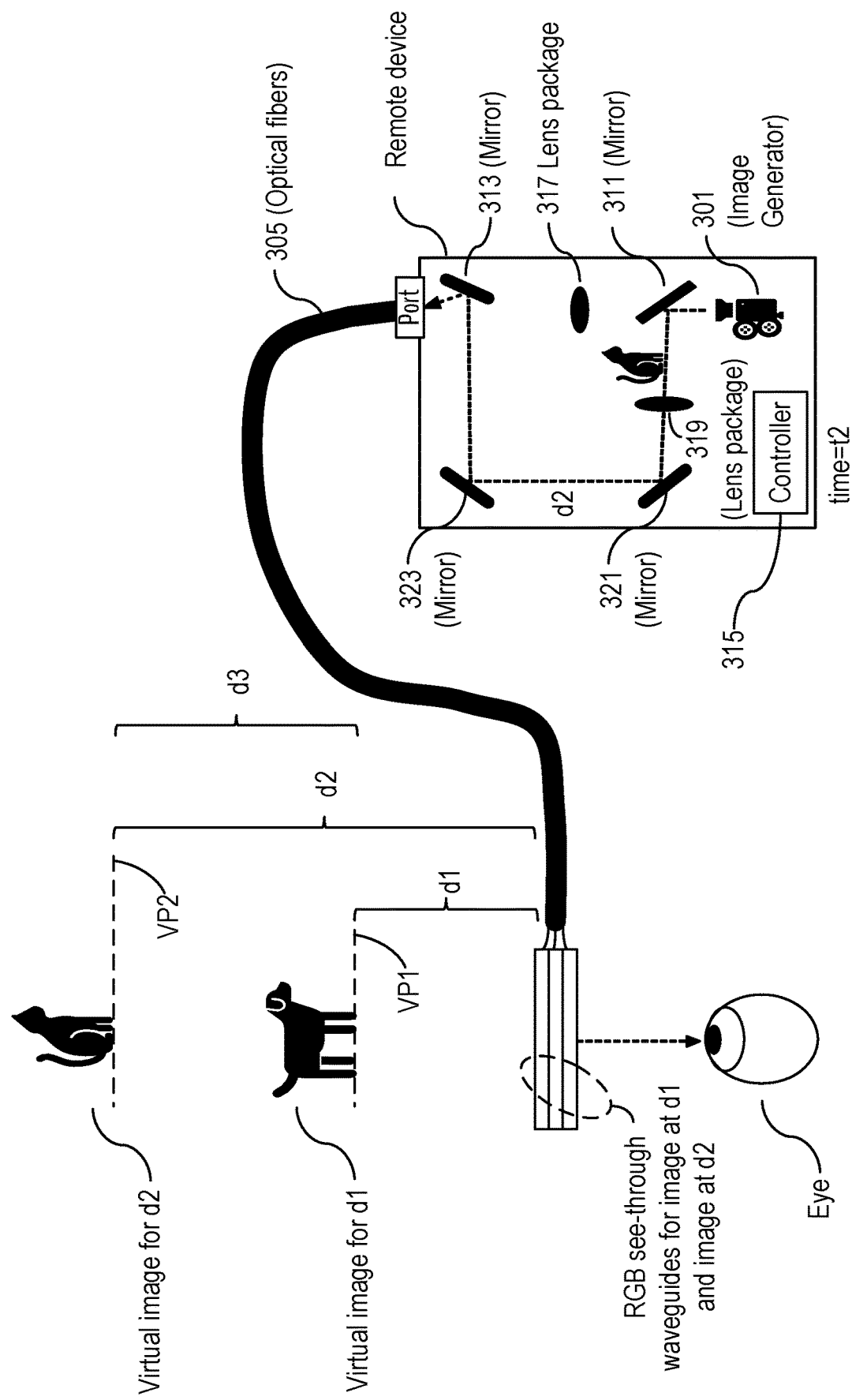

FIG. 4 depicts the state of the remote device 300 at a later period of time, t2. Note: to avoid cluttering the figure, the depiction of the box representing the image director 307 has been omitted. However, it will be understood that in this and subsequent similar figures, the depicted controllers, mirrors, and lens packages are constituent parts of a corresponding image director.

Accordingly, the controller 315 causes the first and second mirrors 311, 313 to reposition themselves such that an image generated by the image generator 301 will flow through a second lens package 319 (for image focusing) to a third mirror 321 which deflects the image to a fourth mirror 323 which deflects the image to the second mirror 313 which has been repositioned to deflect the image to the first output port 309. The distance from the image generator 301 to the first mirror 311, then through the second lens package 319 to the third mirror 321, the fourth mirror 323, the second mirror 313 and then to the first output port 309 corresponds to the second optical path d2.

It will be appreciated from these figures and the discussion that the same number of optical fibers (and in fact the same actual optical fibers 305) is used to convey images for each of the two virtual planes VP1, VP2.

Figure 6:
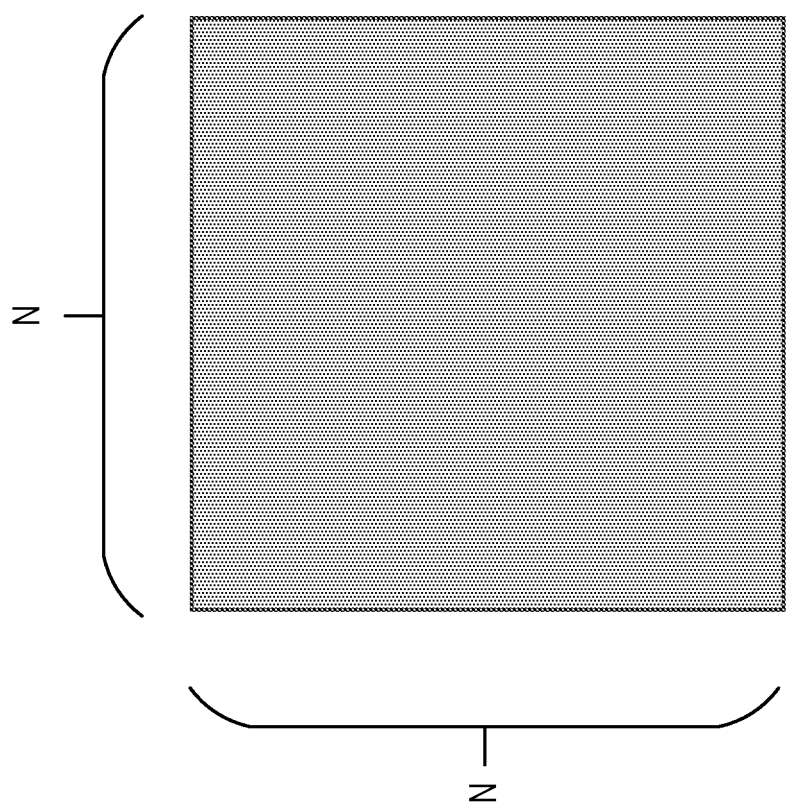
FIGS. 6, 7, and 8 illustrate aspects of pixel resolution division in accordance with some aspects of the technology.

A class of alternative embodiments in which multi-plane images are generated without the use of time-multiplexing will now be described with reference to FIGS. 6 through 16. These embodiments rely in part on the use of pixel resolution division. Referring first to FIG. 6, a pixel array 600 formatted as an N×N arrangement of pixels is available for representing one or more images. It is noted that this arrangement is for purposes of example only, and that in other embodiments the array need not take on the shape of a square.

Figure 7:
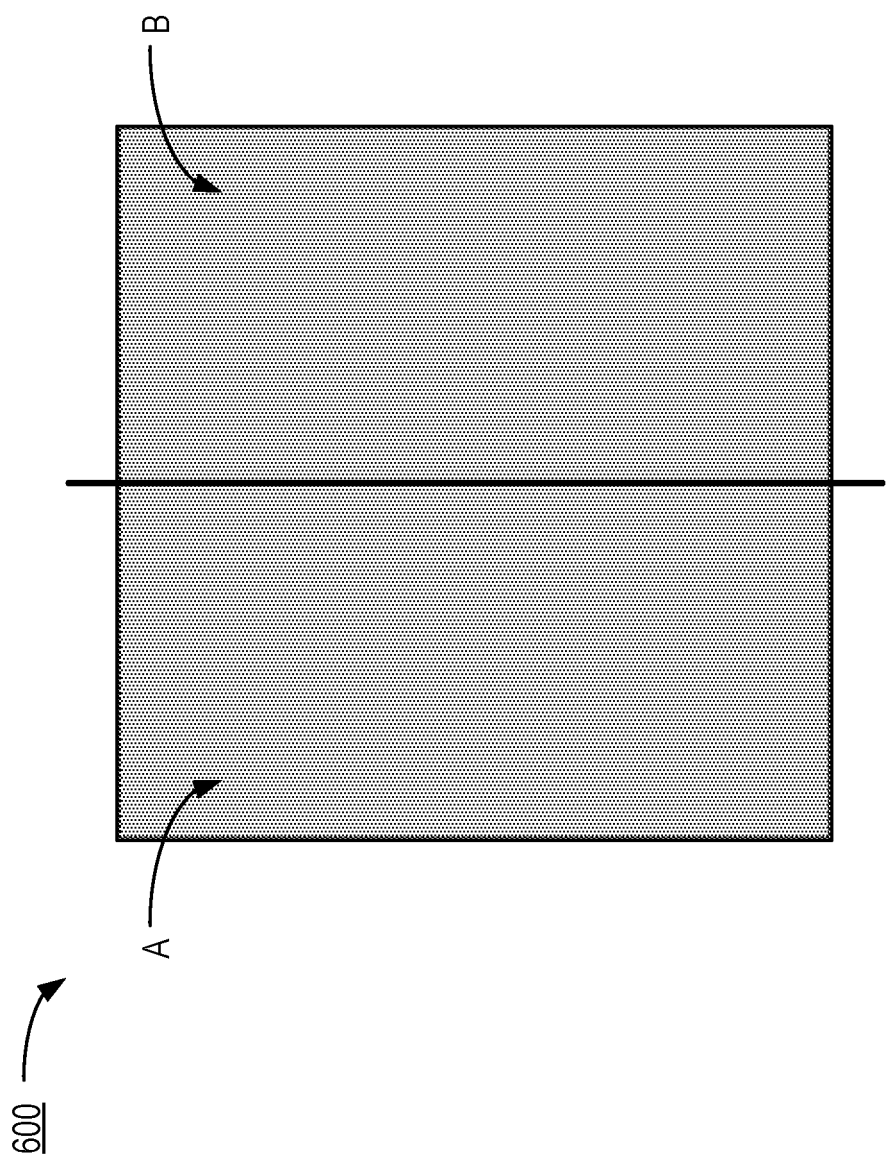
Figure 8:
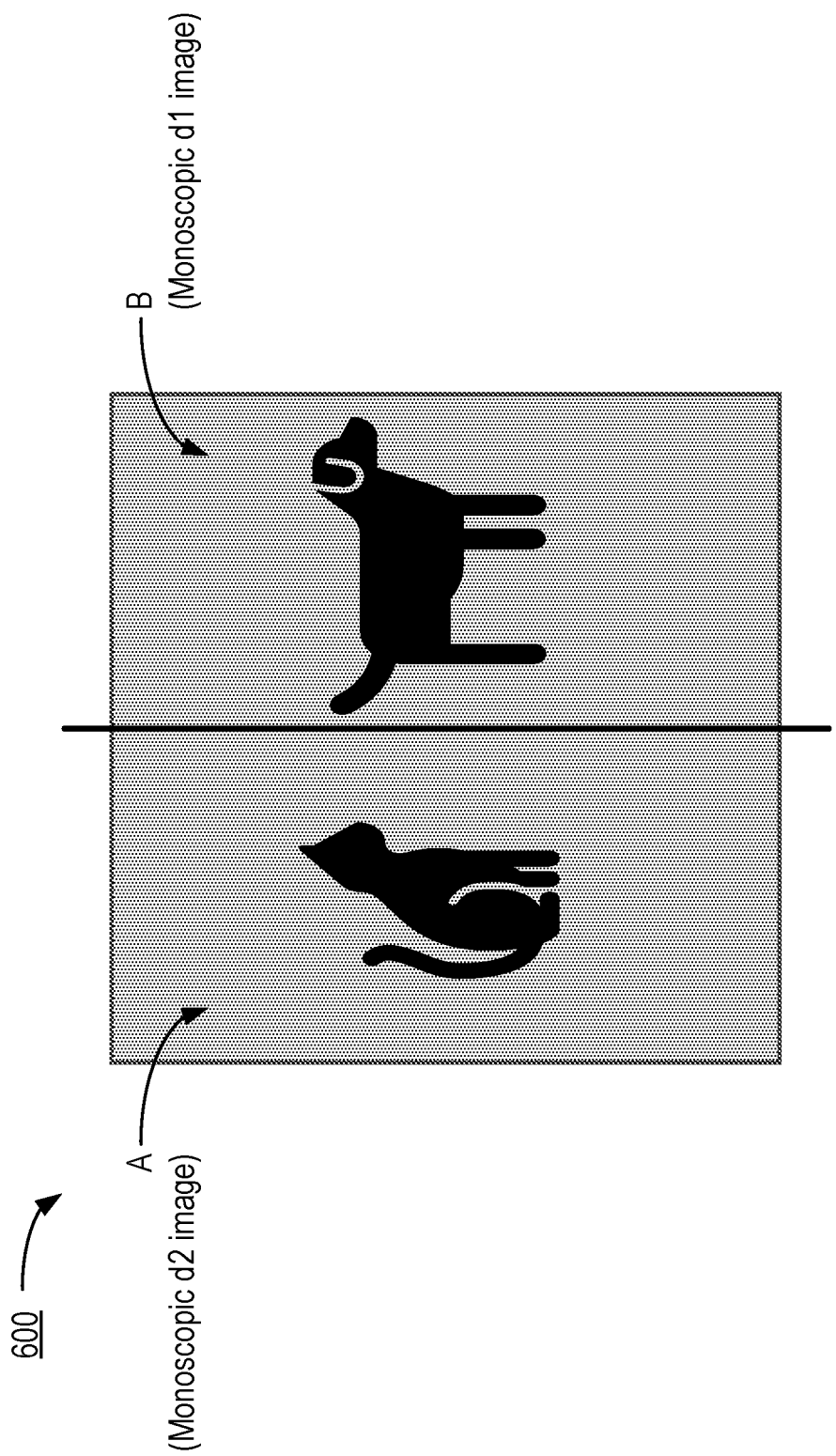

Two alternatives will be described, one for monoscopic image generation, and the other for stereoscopic image generation. Starting first with the monoscopic example, as shown in FIG. 7, the pixel array 600 is conceptually divided up into two partitions, herein denoted partitions A and B respectively. Where the pixel array 600 is considered to represent an overall image, each of the partitions A and B will be considered to represent a respective one of two component parts of the overall image. Next, as shown in FIG. 8, different images are assigned to each of the component parts of the overall image (i.e., partitions of the overall image) in a manner that enables one of a user's eyes to receive sets of plural images intended for display on different virtual planes. For example, FIG. 8 depicts a non-limiting arrangement in which:

an image intended to be seen by one of the user's eyes at a distance of d2 from a user point of view will be projected within a first part (partition A) of the overall image an image intended to be seen by the same one of the user's eyes at a distance of d1 from the user point of view will be projected within a second part (partition B) of the overall image It is noted that for purposes of illustration, FIG. 8 depicts a horizontal division of images. In alternative embodiments, other types of division (e.g., vertical division) can be used, and in such cases mirror control (to be described in the following) is adapted accordingly.

Figure 9:
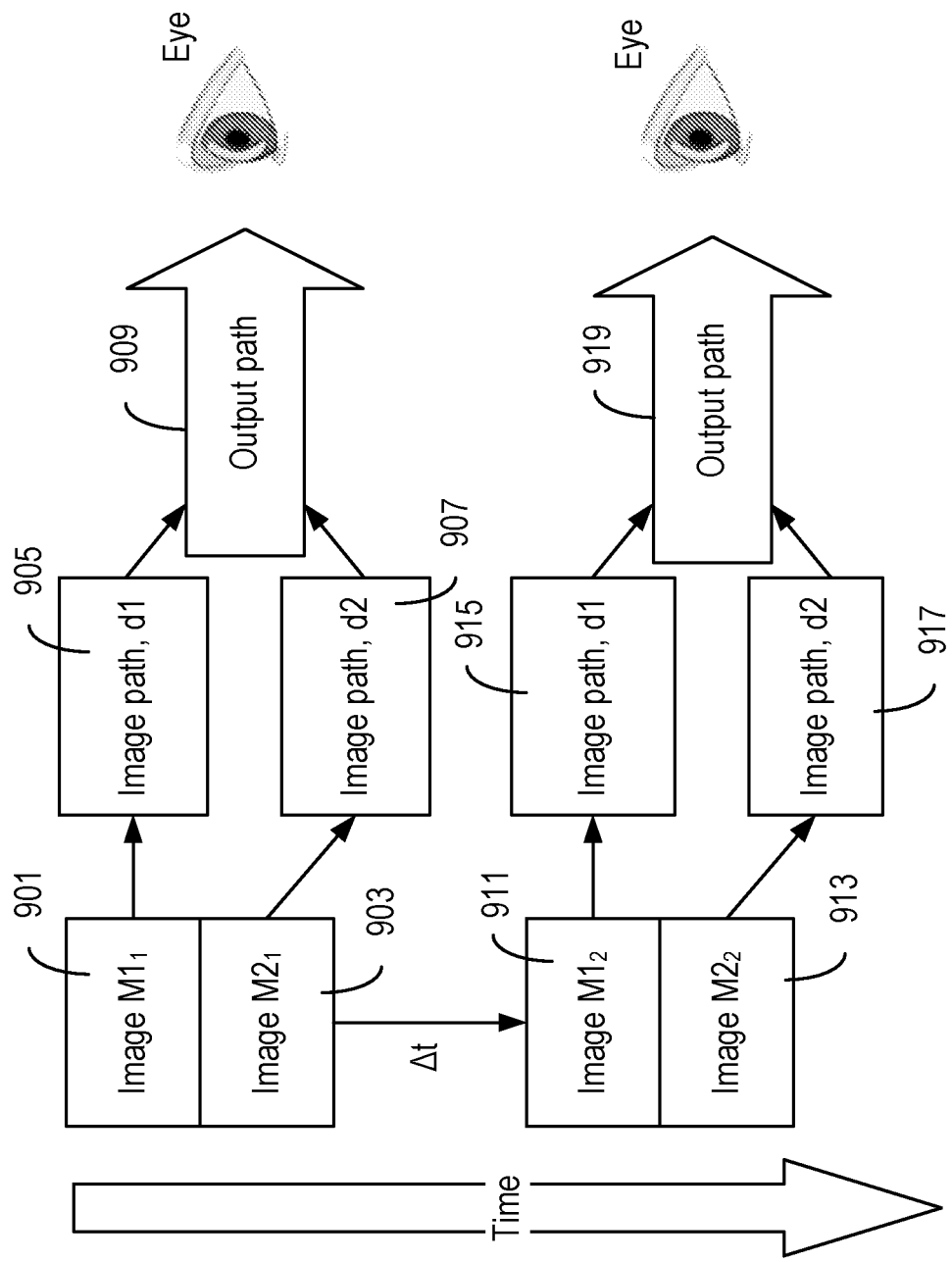
FIGS. 9 and 10 illustrate aspects of the disclosed technology in which pixel resolution division is used to display images situated on multiple virtual planes.

Referring now to FIG. 9, in order to display these images to the user, the image director 307 receives (step 901), during a first period of time, a first image $M1_1$ to be perceived as being at a first distance d1 from a user point of view and also during the first period of time, a second image $M2_1$ (step 903) to be perceived as being at a second distance d2 from a user point of view. These two images are configured as component parts of an overall image as previously shown in FIG. 8. Accordingly, the image director 307 directs (step 905) the first image $M1_1$ to a first optical image path corresponding to the distance d1 and simultaneously directs (step 907) the second image $M2_1$ to a second optical image path corresponding to the distance d2. The first image $M1_1$ emerges at the end of the first optical image path and is supplied (step 909) to a first output port of the remote device 300, from which it is then conveyed to the see-through waveguides 303 for viewing by the user. Concurrently, the second image $M2_1$ emerges at the end of the second optical image path and is also supplied (step 909) to the first output port of the remote device 300. The two images are then guided to the see-through waveguides 303 for viewing by the user.

This process is repeated for subsequent frames as well. To illustrate this point, FIG. 9 also shows that the image director 307 receives (step 911), during a second period of time, another first image $M1_2$ to be perceived as being at the first distance d1 from the user point of view and also during the second period of time, a second image $M2_2$ (step 913) to be perceived as being at the second distance d2 from the user point of view. These two images are configured as component parts of an overall image as previously shown in FIG. 8. Accordingly, the image director 307 directs (step 915) the "another" first image $M1_2$ to the first optical image path corresponding to the distance d1 and simultaneously directs (step 917) the "another" second image $M2_2$ to the second optical image path corresponding to the distance d2. The "another" first image $M1_2$ emerges at the end of the first optical image path and is supplied (step 919) to the first output port of the remote device 300, from which it is then conveyed to the see-through waveguides 303 for viewing by the user. Concurrently, the "another" second image $M2_2$ emerges at the end of the second optical image path and is also supplied (step 919) to the first output port of the remote device 300. The two images are then guided to the see-through waveguides 303 for viewing by the user during the second period of time.

In some but not necessarily all embodiments consistent with the invention, the image director 307 uses a controller to dynamically alter the positions of a first area part of an electro-mechanical mirror array such that a first image that is a component part of an overall image projected by an image generator will be caused to traverse one of a number of possible optical paths within the remote device 300, and concurrently alter the positions of a second area part of the electro-mechanical mirror array such that a second image that is a component part of the overall image projected by the image generator will be caused to traverse a different one of the number of possible optical paths within the remote device 300.

Figure 10:
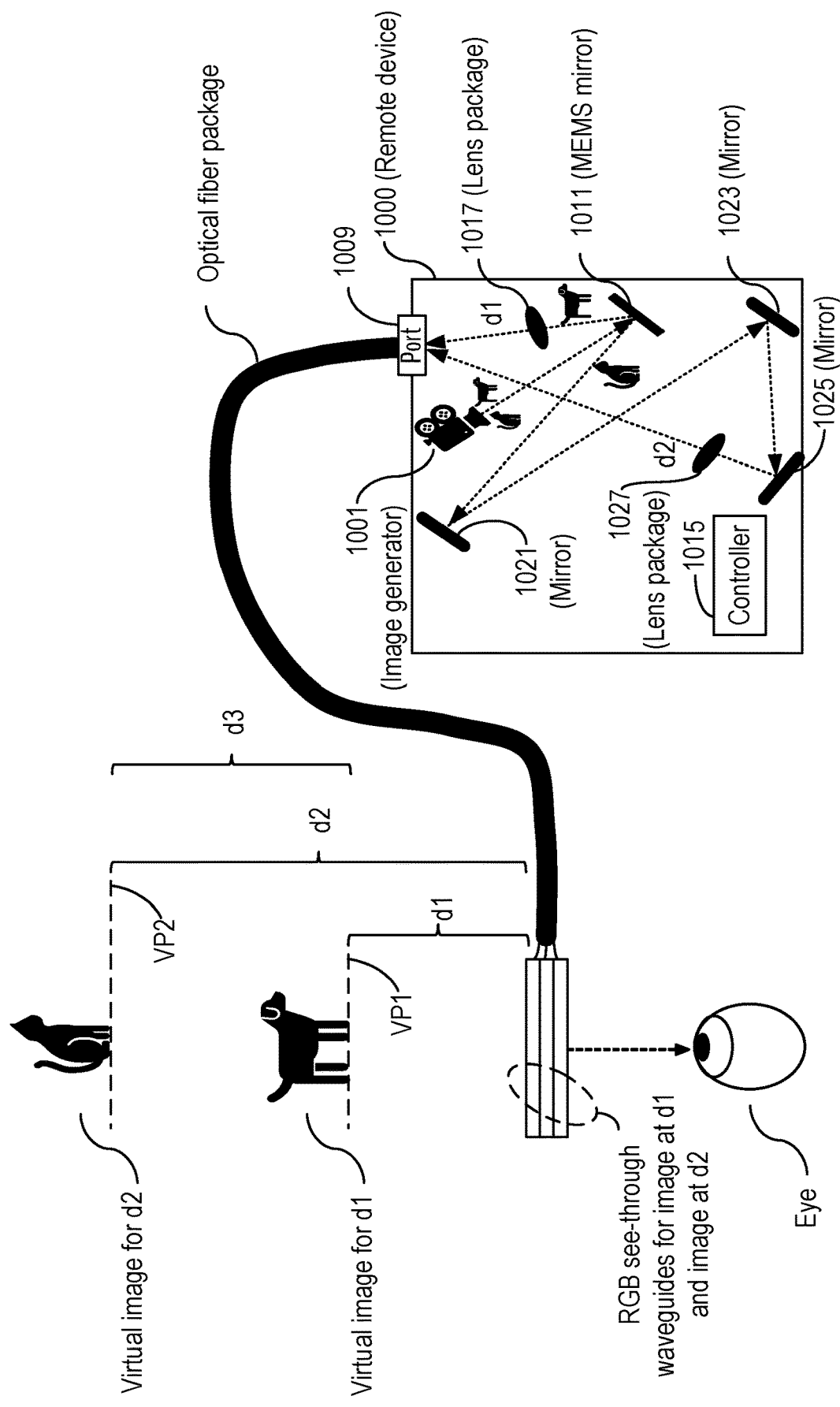

To illustrate this point further, reference is made to FIG. 10 which depicts elements of an image director (not shown in order to avoid overly cluttering the figure) whose elements comprise, among others, a controller 1015 and a first mirror 1011, which is an electro-mechanical mirror as just mentioned. The controller 1015 causes the first mirror 1011 to effectively operate as two mirrors by positioning first and second area parts of the mirror differently. The first area part of the first mirror 1011 is in the path of a first component part of an overall image generated by the image generator 1001, and a second area part of the first mirror 1011 is in the path of a second component part of the overall image generated by the image generator 1001. Mirror control is done in a way such that the first component part of the overall image generated by the image generator 1001 will be reflected by the first area part of the mirror 1011 towards a direction that causes it to flow through a first lens package 1017 (for image focusing) directly to a first output port 1009. The distance from the image generator 1001 to the first output port 1009 corresponds to the first optical path d1.

At the same time, the controller 1015 causes the second area part of the first mirror 1011 to be angled in a way such that the second component part of the overall image generated by the image generator 1001 will be reflected by the second area part of the mirror 1011 in a direction that causes it to be reflected by second, third, and fourth mirrors 1021, 1023, and 1025 in succession and then through a second lens package 1027 (for image focusing) to the first output port 1009. The distance from the image generator 1001 to the first, second, third, and fourth mirrors 1011, 1021, 1023, and 1025 and then through the second lens package 1027 to the first output port 1009 corresponds to the second optical path d2.

It is worth noting that embodiments relying on pixel resolution division, such as those just described with respect to FIGS. 7, 8, and 9 bring up the issue of how to handle occlusion. For example, it can be seen that in an embodiment as illustrated in FIG. 10, an image, associated with a first virtual plane, travels to the first output port 1009 via the first optical path d1 and another image, associated with a second virtual plane, travels to the same first output port 1009 via the second optical path d2. This means that light from two different sources will both converge at the first output port 1009. This is essentially an issue that can be handled by the image generator 1001 in any of a number of different ways. For example, if the image depicted at the first virtual plane VP1 is considered to be in front of the image depicted at the second virtual plane VP2, the image generator can arrange for the pixel associated with the second virtual plane VP2 to be turned off, so that the user will see only the image depicted at the first virtual plane VP1. Alternatively, it may be desired to allow some degree of transparency when one image is in front of another. Again, this can be handled by the image generator 1001 by, for example, allowing the light from the two sources to mix at the first output port 1009. Or, in another alternative, the image generator VP1 can adjust the image associated with the first virtual plane VP1 to create the effect of transparency, while concurrently turning off the pixel associated with the second virtual plane VP2. Those skilled in the art will recognize that other solutions also exist.

In another class of alternative embodiments, the principal of image resolution division is extended to provide multi-plane, stereoscopic images. Several of these embodiments will now be described with reference to FIGS. 11 through 18.

Figure 11:
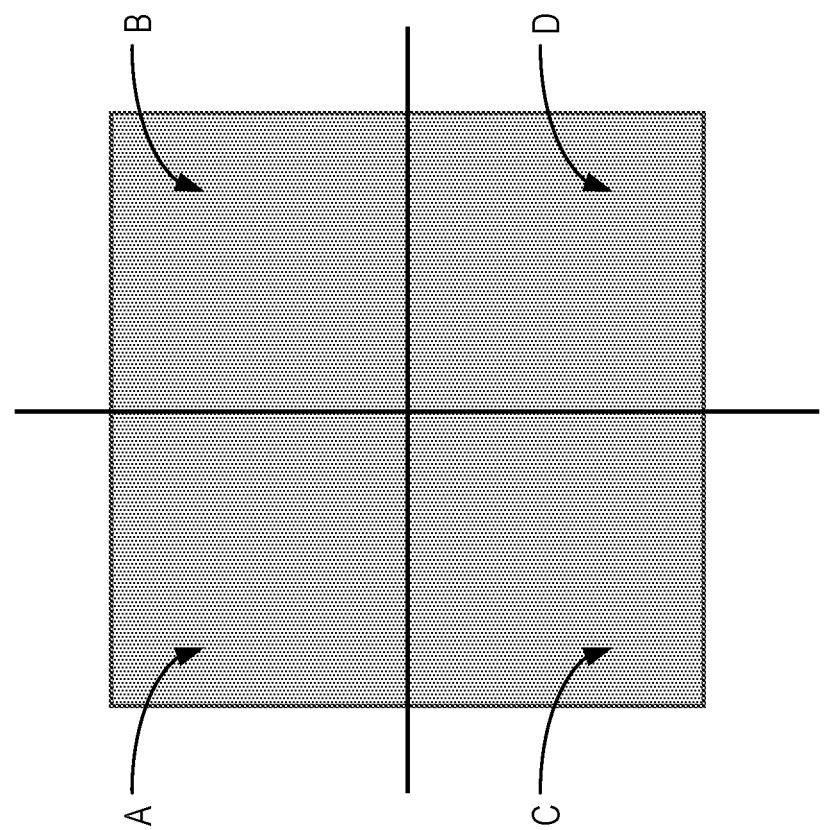
FIGS. 11 and 12 illustrate further aspects of pixel resolution division in accordance with some aspects of the technology relating to stereoscopic images having multiple virtual planes.
Figure 12:
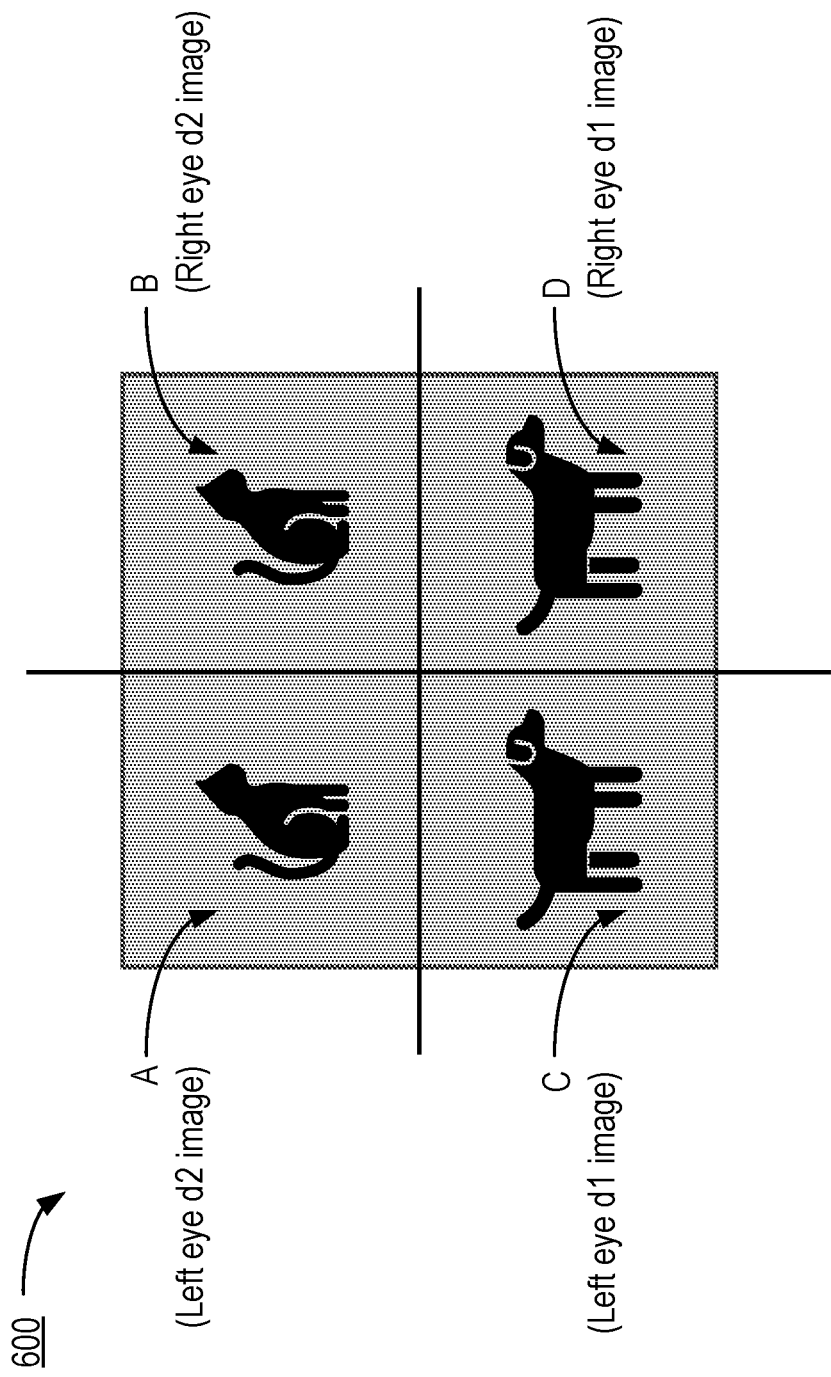

In one aspect, as shown in FIG. 11, the pixel array 600 of FIG. 6 is conceptually divided up into four quadrants, hereinafter denoted quadrants A, B, C, and D respectively. Where the pixel array 600 is considered to represent an overall image, each of the quadrants A, B, C, and D will be considered to represent a respective one of four component parts of the overall image. Next, as shown in FIG. 12, different images are assigned to each of the component parts of the overall image (i.e., quadrants of the overall image) in a manner that enables each of a user's eyes to receive corresponding left and right sets of images, with each one of the left and right sets itself comprising sets of plural images intended for display on different virtual planes. For example, FIG. 12 depicts a non-limiting arrangement in which:

an image intended to be seen by a left eye at a distance of d2 from a user point of view will be projected within a first part (quadrant A) of the overall image an image intended to be seen by the left eye at a distance of d1 from the user point of view will be projected within a second part (quadrant C) of the overall image an image intended to be seen by a right eye at a distance of d2 from the user point of view will be projected within a third part (quadrant B) of the overall image an image intended to be seen by the right eye at a distance of d1 from the user point of view will be projected within a fourth part (quadrant D) of the overall image.

Figure 13:
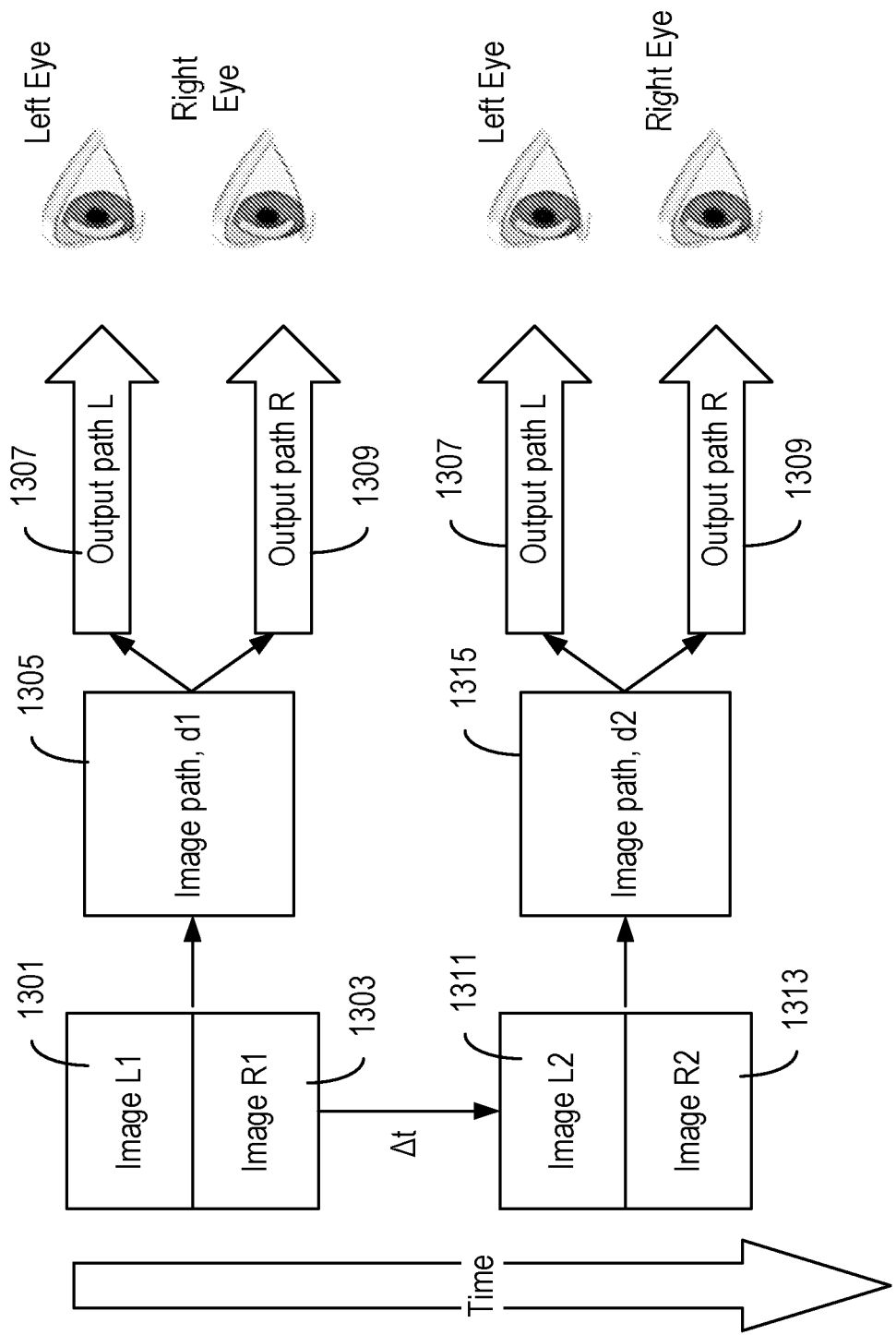
FIGS. 13, 14, and 15 illustrate exemplary embodiments in which pixel resolution division is used in conjunction with time division multiplexing to display stereoscopic images situated on multiple virtual planes.

Referring now to FIG. 13, in order to display these images to the user, in one class of embodiments, the image director 307 receives (step 1301), during a first period of time, a first image L1 to be perceived by a left eye of the user as being at a first distance d1 from a user point of view and also during the first period of time, receives (step 1303) a second image R1 to be perceived by a right eye of the user as being at the first distance d1 from the user point of view. These two images are configured as component parts C and D of the overall image as previously shown in FIG. 12. Accordingly, the image director 307 directs (step 1305) the first image L1 to a first optical image path 1307 corresponding to the distance d1 and leading to a Left output port of the device and simultaneously directs (step 1305) the second image R1 to a second optical image path 1309 also corresponding to the distance d1 but leading to a Right output port of the device. The Left and Right output ports of the device are then guided to respective Left and Right see-through waveguides (not shown) for viewing by the user.

Next, during a second period of time (e.g., occurring Δt after the first period of time), the image director 307 receives (step 1311) a third image L2 to be perceived by the left eye of the user as being at a second distance d2 from the user point of view and also during the second period of time, receives (step 1313) a fourth image R2 to be perceived by the right eye of the user as being at the second distance d2 from the user point of view. These two images are configured as component parts A and B of the overall image as previously shown in FIG. 12. Accordingly, the image director 307 directs (step 1315) the third image L2 to a second optical image path corresponding to the distance d2 and leading to the Left output port 1307 of the device and simultaneously directs (step 1315) the fourth image R2 to the second optical image path also corresponding to the distance d2 but leading to the Right output port 1309 of the device. As before, the Left and Right output ports 1307, 1309 of the device are then guided to respective Left and Right see-through waveguides (not shown) for viewing by the user.

It will be understood that the display of the first and second images L1 and R1 during the first period of time followed by the display of the third and fourth images L2 and R2 during the second period of time occur rapidly enough that the user does not perceive the switching, but instead perceives the four images as being displayed at the same time, two at a first virtual plane VP1 and the other two at a second virtual plane VP2. This corresponds to one frame of a stereoscopic three-dimensional image.

Figure 14:
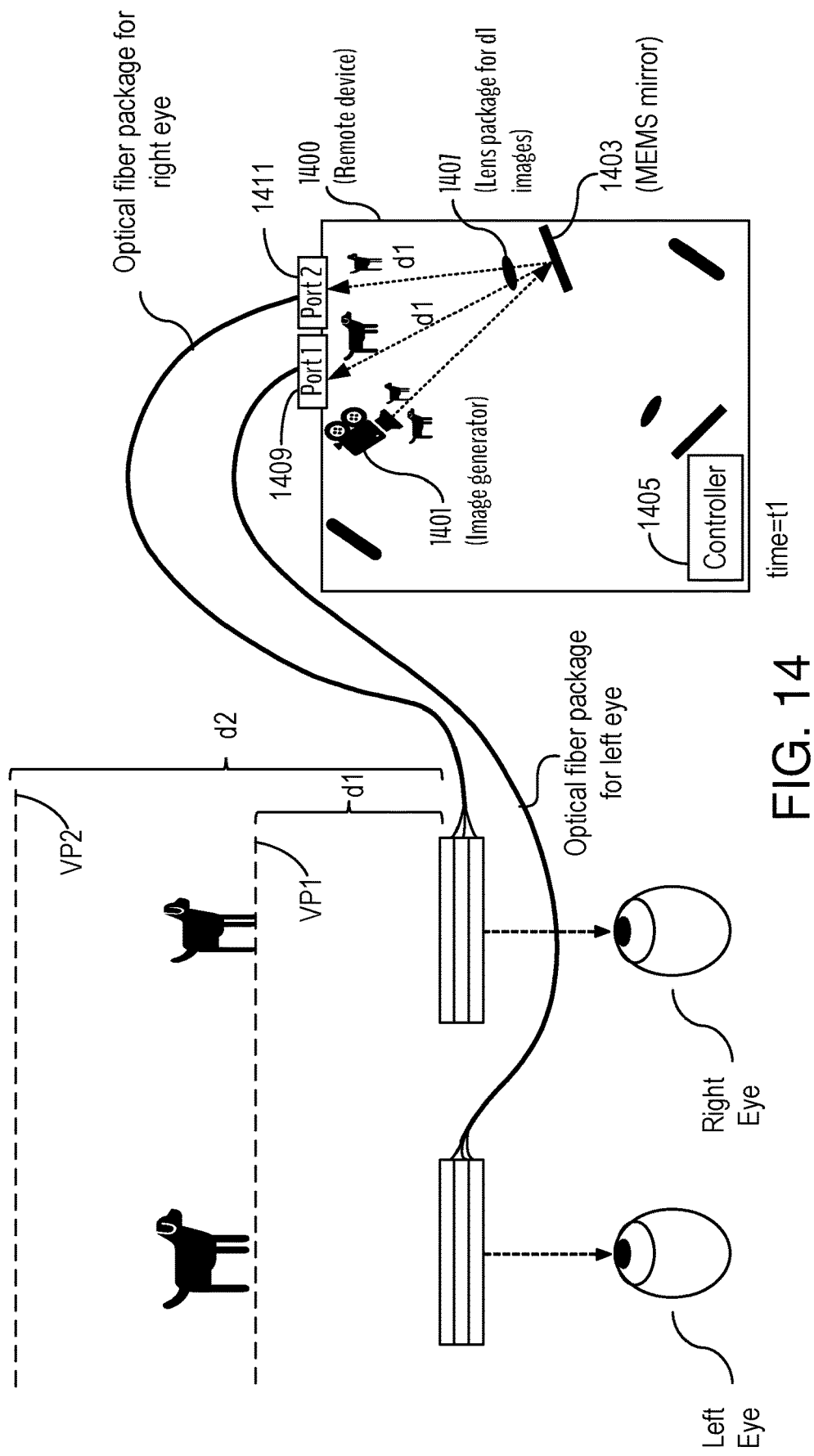

An exemplary embodiment corresponding to aspects discussed with reference to FIG. 13 will now be described with reference to FIGS. 14 and 15. Referring first to FIG. 14, a configuration of a remote device 1400 is shown at a first time period t1. An image generator 1401 projects a first image L1 onto a first area part of a first electro-mechanical mirror 1403, and projects a second image R1 onto a second area part of the first electro-mechanical mirror 1403. A controller 1405 causes the first electro-mechanical mirror 1403 to act in a split fashion, such that the first area part of the electro-mechanical mirror 1403 redirects the first image L1 through a first lens package 1407 to a first output port 1409 from which it progresses through optical waveguides to see-through waveguides for viewing by a user's left eye; and concurrently causes a second area part of the electro-mechanical mirror 1403 to redirect the second image R1 through the first lens package 1407 to a second output port 1411 from which it progresses through optical waveguides to see-through waveguides for viewing by a user's right eye. The distances that the first and second images L1 and R1 cover from the image generator 1401 to the respective first and second output ports 1409, 1411 corresponds to the first distance d1. These two images are configured as component parts C and D of the overall image as previously shown in FIG. 12.

Figure 15:
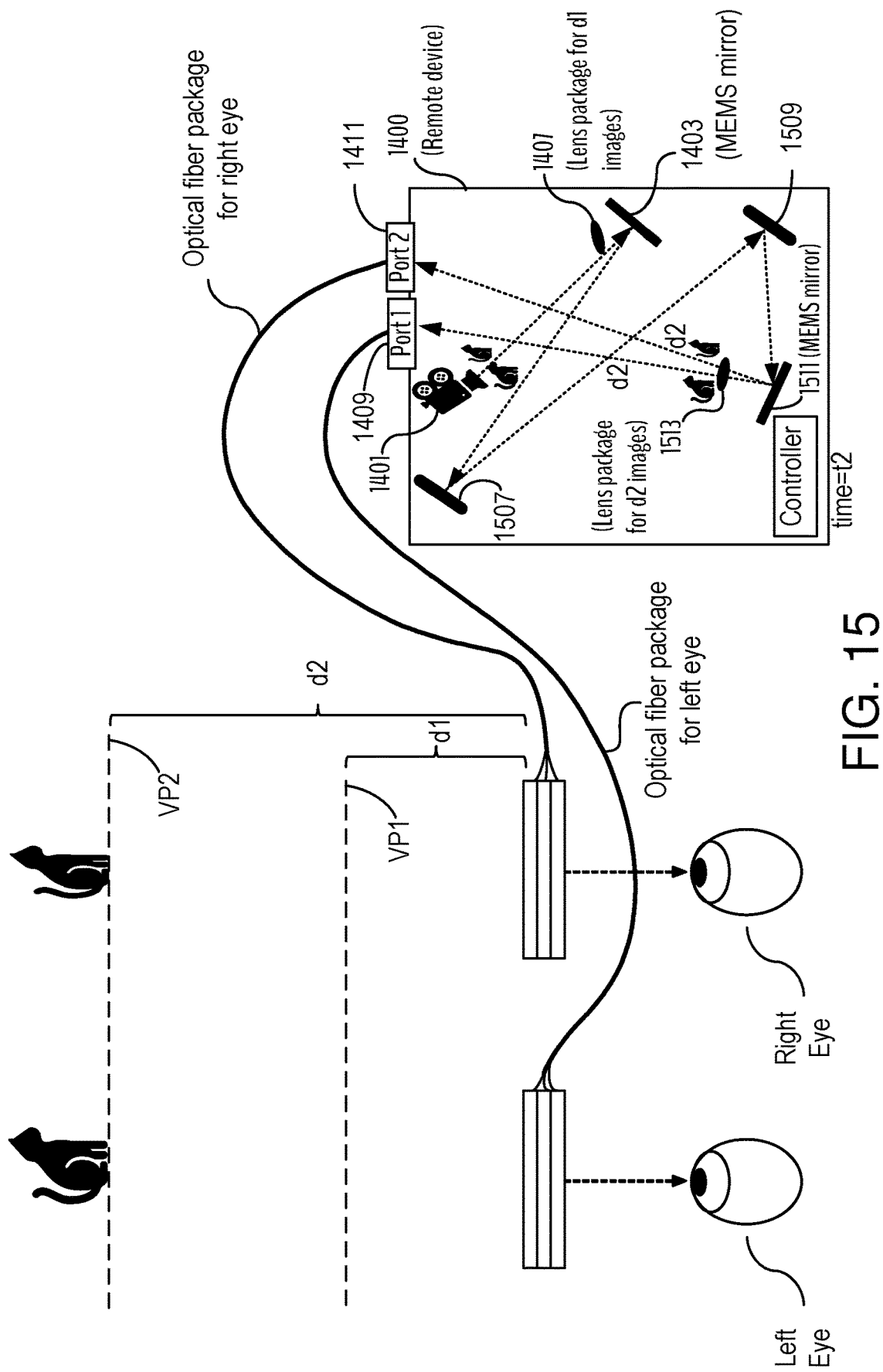

FIG. 15 depicts a configuration of the remote device 1400 at a second time period t2. The image generator 1401 projects a third image L2 onto a third area part of the first electro-mechanical mirror 1403, and projects a fourth image R2 onto a fourth area part of the first electro-mechanical mirror 1403. The controller 1405 causes the third and fourth area parts of the first electro-mechanical mirror 1403 to act in a split fashion, such that the third and fourth area parts of the first electro-mechanical mirror 1403 redirect the third image L2 and the fourth image R2 to a second mirror 1507 which redirects the images to a third mirror 1509, which then redirects the images to a fourth mirror 1511 that is also an electro-mechanical mirror. The controller 1405 causes the fourth mirror 1511 to act in a split fashion, such that a first area part of the fourth mirror 1511 redirects the third image L2 through a second lens package 1513 to the first output port 1409 from which it progresses through optical waveguides to see-through waveguides for viewing by the user's left eye; and concurrently causes a second area part of the fourth mirror 1511 to redirect the fourth image R2 through the second lens package 1513 to the second output port 1411 from which it progresses through optical waveguides to see-through waveguides for viewing by the user's right eye. The distances that the third and fourth images L2 and R2 cover from the image generator 1401, past the first, second, third, and fourth mirrors 1403, 1507, 1509, 1511, then through the second lens package 1513 to the respective first and second output ports 1409, 1411 corresponds to the second distance d2. These two images are configured as component parts A and B of the overall image as previously shown in FIG. 12.

It will be appreciated that the just-described embodiments combine pixel resolution division with time multiplexing to present stereoscopic multiplane images to a user. In these embodiments, images are presented concurrently to the left and right eyes of the user, with time multiplexing being used to alternately display images associated with a first virtual plane VP1 and a second virtual plane VP2.

In other alternative embodiments, pixel resolution division and time multiplexing are again used, but this time to concurrently present images associated with the first virtual plane VP1 and the second virtual plane VP2 for one of the user's eyes during a first period of time t1, and then during a second period of time t2 to concurrently present images associated with the first virtual plane VP1 and the second virtual plane VP2 for another one of the user's eyes. These embodiments will now be illustrated by exemplary embodiments shown in FIGS. 16 and 17.

Figure 16:
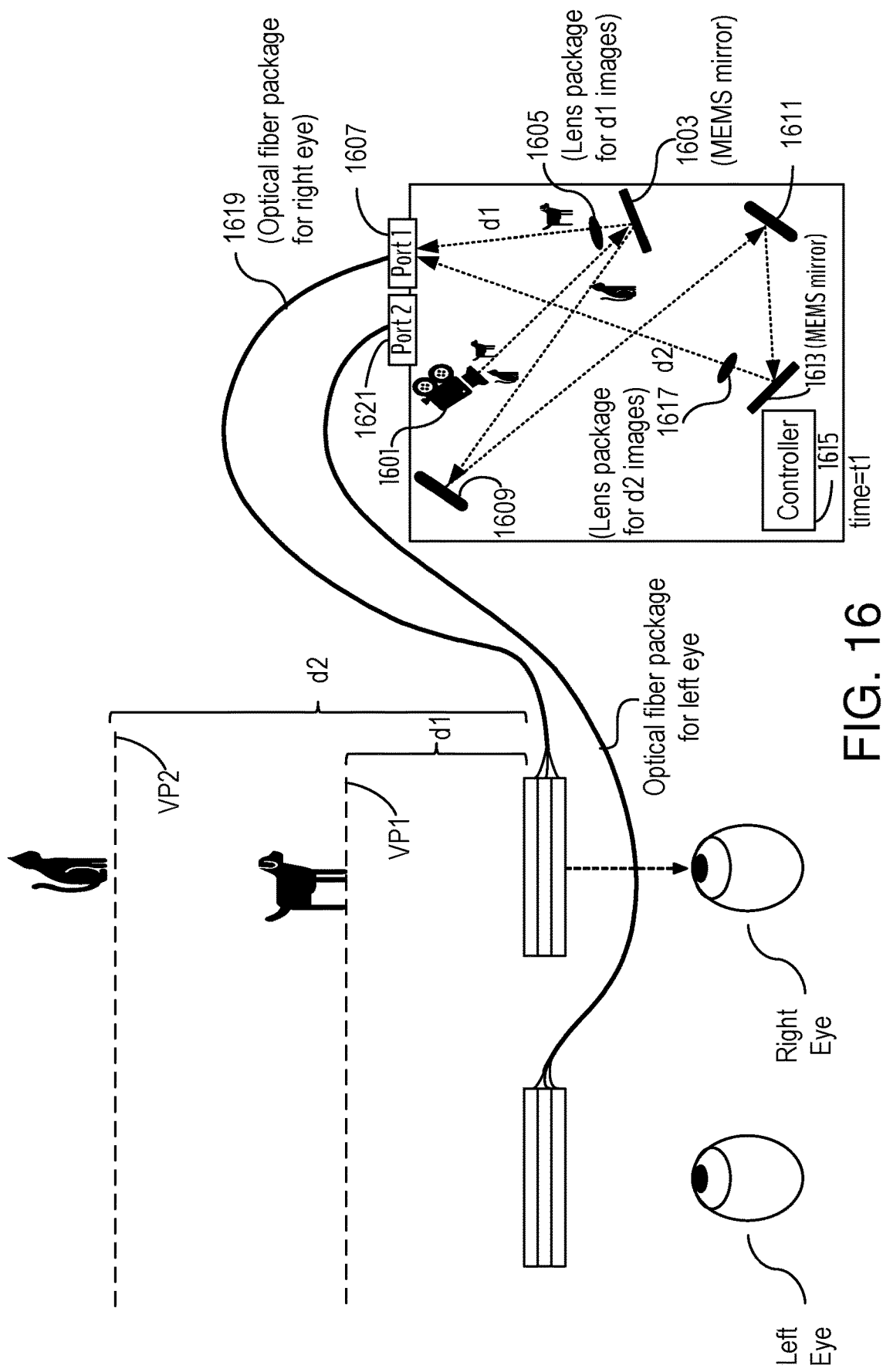
FIGS. 16 and 17 illustrate alternative exemplary embodiments in which pixel resolution division is used in conjunction with time division multiplexing to display stereoscopic images situated on multiple virtual planes.

FIG. 16 depicts elements of an image director (not shown in order to avoid overly cluttering the figure) whose elements comprise, among others, a controller 1615 and a first mirror 1603, which is an electro-mechanical mirror as mentioned earlier. During a first period of time t1, the controller 1615 causes the first mirror 1603 to effectively operate as two mirrors by positioning first and second area parts of the mirror differently. The first area part of the first mirror 1603 is in the path of a first component part of an overall image generated by the image generator 1601, and a second area part of the first mirror 1603 is in the path of a second component part of the overall image generated by the image generator 1601. Mirror control is done in a way such that the first component part of the overall image generated by the image generator 1601 will be reflected by the first area part of the mirror 1603 towards a direction that causes it to flow through a first lens package 1605 (for image focusing) directly to a first output port 1607. The distance from the image generator 1601 to the first output port 1607 corresponds to the first optical path d1 when reflected by the first mirror 1603 in this manner.

At the same time, still during the first period of time t1, the controller 1615 causes the second area part of the first mirror 1603 to be angled in a way such that the second component part of the overall image generated by the image generator 1601 will be reflected by the second area part of the mirror 1603 in a direction that causes it to be reflected by second, third, and fourth mirrors 1609, 1611, and 1613 in succession and then through a second lens package 1617 (for image focusing) to the first output port 1607. The distance from the image generator 1601 to the first, second, third, and fourth mirrors 1603, 1609, 1611, and 1613 and then through the second lens package 1617 to the first output port 1607 corresponds to the second optical path d2. The first output port 1607 in this example attaches to an optical fiber package 1619 that guides the two virtual plane images to see-through waveguides for viewing by a user's right eye.

Figure 17:
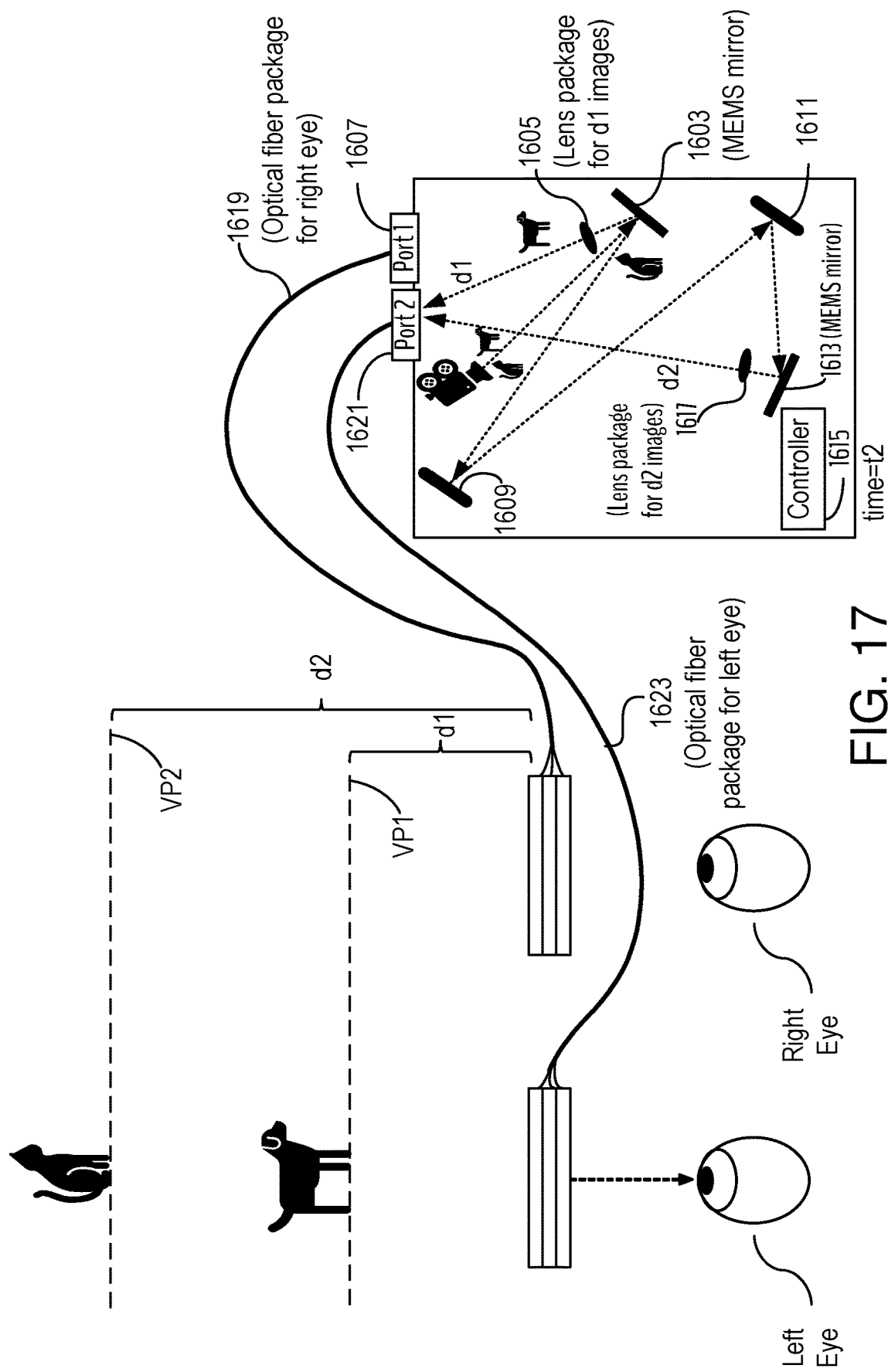

Virtual plane images for viewing by the user's left eye are generated next. In particular, FIG. 17 depicts the configuration during a next period of time t2 when the controller 1615 causes the first mirror 1603 to again effectively operate as two mirrors by positioning first and second area parts of the mirror differently. The first area part of the first mirror 1603 is in the path of a first component part of an overall image generated by the image generator 1601, and a second area part of the first mirror 1603 is in the path of a second component part of the overall image generated by the image generator 1601. Mirror control is different from before (i.e., different from what is shown in FIG. 16) because now it is done in a way such that the first component part of the overall image generated by the image generator 1601 will be reflected by the first area part of the mirror 1603 towards a direction that causes it to flow through the first lens package 1605 (for image focusing) directly to a second output port 1621. The distance from the image generator 1601 to the second output port 1621 corresponds to the first optical path d1 when reflected by the first mirror 1603 in this manner.

At the same time, still during the second period of time t2, the controller 1615 causes the second area part of the first mirror 1603 to be angled in a way such that the second component part of the overall image generated by the image generator 1601 will be reflected by the second area part of the mirror 1603 in a direction that causes it to be reflected by second, third, and fourth mirrors 1609, 1611, and 1613 in succession and then through the second lens package 1617 (for image focusing) to the second output port 1621. The distance from the image generator 1601 to the first, second, third, and fourth mirrors 1603, 1609, 1611, and 1613 and then through the second lens package 1617 to the second output port 1621 corresponds to the second optical path d2. The second output port 1621 in this example attaches to a second optical fiber package 1623 that guides the two virtual plane images to see-through waveguides for viewing by a user's left eye.

In yet another alternative embodiment, pixel resolution division is used without time multiplexing to produce stereoscopic multiplane images for viewing by a user. Here as before in some of the other embodiments, different images are assigned to each of the component parts of the overall image (i.e., quadrants of the overall image) in a manner that enables each of a user's eyes to receive corresponding left and right sets of images, with each one of the left and right sets itself comprising sets of plural images intended for display on different virtual planes. Reference is again made to FIG. 12 to illustrate this aspect.

Figure 18:
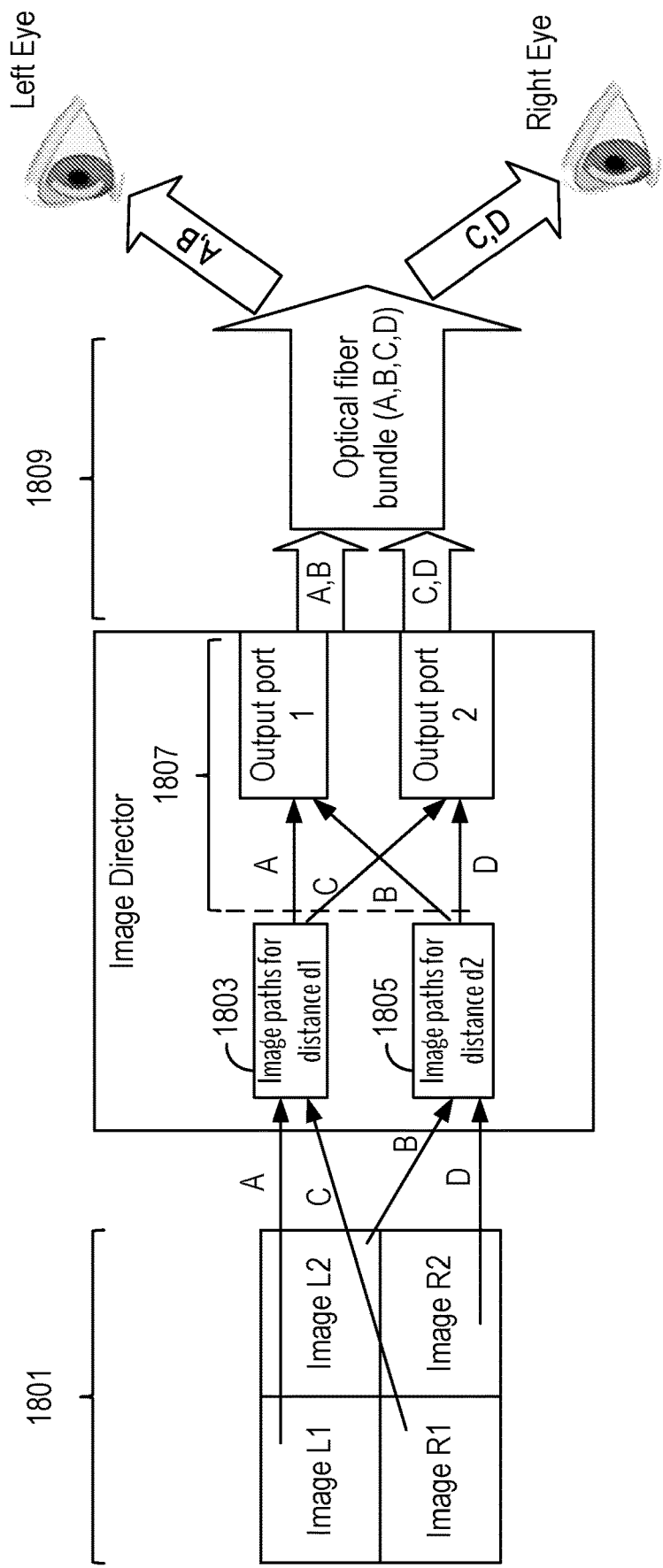
FIG. 18 illustrates another alternative exemplary embodiment in which pixel resolution division is used to display stereoscopic images situated on multiple virtual planes.

Referring now to FIG. 18, in this class of embodiments, the image generator produces an overall image comprising four component parts as illustrated in FIG. 12 and projects these (step 1801) to the image director. The image director (e.g., by controlling parts of several electro-mechanical mirror arrays) causes first virtual plane images L1 and R1 to travel a first distance d1 to one of two output ports (step 1803) and concurrently causes second virtual plane images L2 and R2 to travel a second distance d2 to the other one of the two output ports (step 1805). In addition, the image director sorts the four component parts of the overall image so that the two component parts to be viewed by one of the user's eyes is directed to a first output port, and the other two component parts (which are to be viewed by the other one of the user's eyes) is directed to a second output port (step 1807). The two output ports supply the image pairs to respective optical fibers which guide them to the see-through waveguides for viewing by the user's left and right eyes (step 1809).

Figure 19:
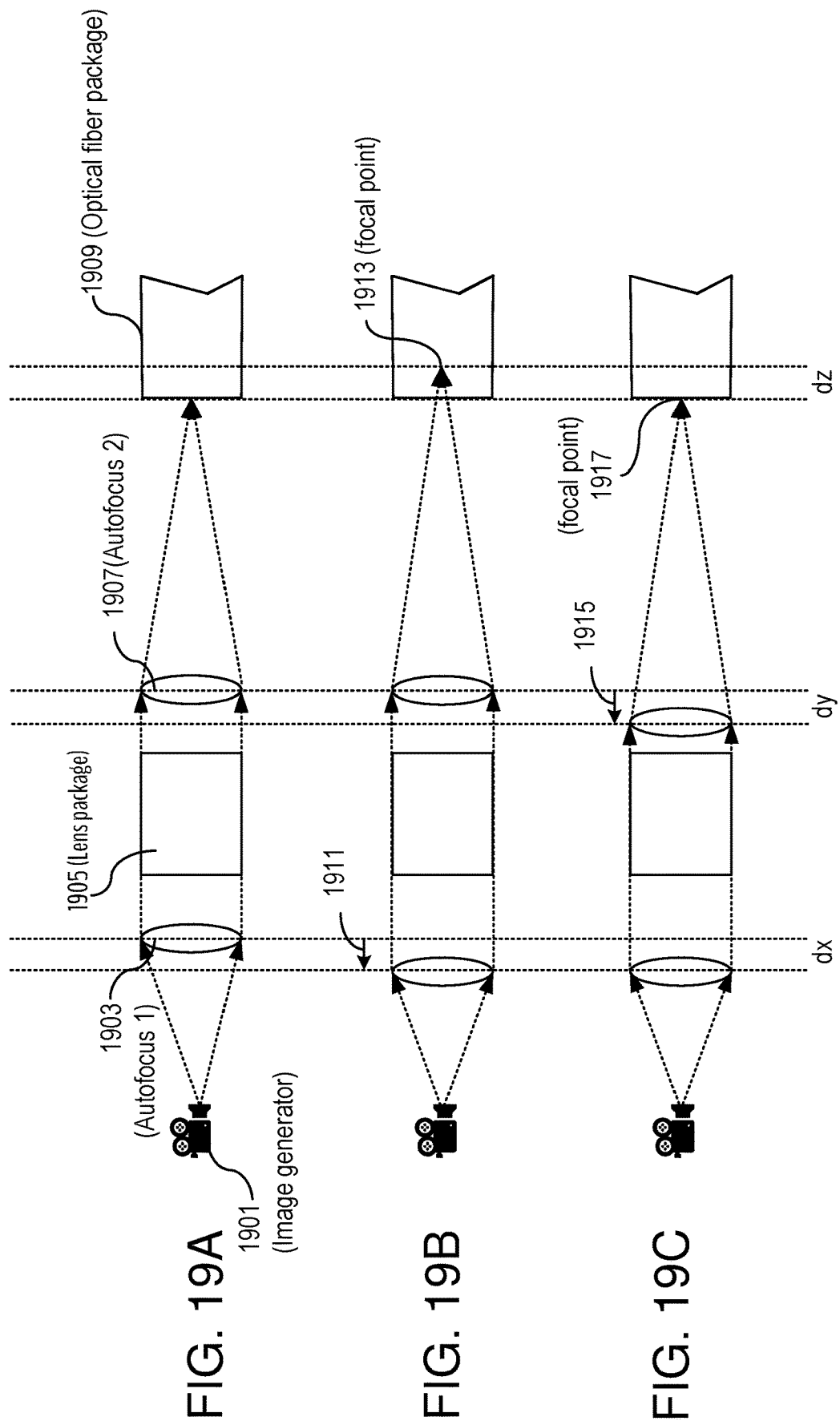
FIGS. 19A, 19B, and 19C illustrate an exemplary arrangement for dynamically altering the location of a virtual plane in accordance with some embodiments consistent with the invention.

FIGS. 19A, 19B, and 19C depict aspects of the technology relating to dynamic adjustment of distances associated with virtual planes. Up to this point, the embodiments have illustrated only fixed virtual plane distances, for example, the distances d1 and d2. However, other aspects of the technology permit these to be dynamically adjustable. Referring first to FIG. 19A, a configuration for displaying a first virtual plane is shown. An image generator 1901 projects an image onto a first autofocus lens 1903. The image emerges from the first autofocus lens 1903, goes through a lens package 1905, and then goes to a second autofocus lens 1907. The image emerging from the second autofocus lens 1907 is focused onto an optical fiber package 1909, which guides the image to a user headset as described in earlier embodiments.

The size of the image can be altered to create the impression of the depicted image being a different distance away from the user. To achieve this, as shown in FIG. 19B, the first autofocus lens 1903 is moved some amount (dx) to a different position (step 1911). (It is noted that the arrangement may include additional lenses inside the lens package that need to move as well in order to make the virtual distance appeared to be the wanted position—these have not been shown in the figure in order to avoid obscuring the discussion with unnecessary details that would be known to a person of ordinary skill in the art.)

In addition to changing the size of the image, moving the first autofocus lens 1903 also has the effect of blurring the image at the point that it is projected onto the optical fiber package 1909. This is shown in FIG. 19B as the focal point 1913, which is an undesired amount (dz) inside the optical fiber package 1909.

To compensate for this unwanted blurriness, the second autofocus lens 1907 is also moved by an amount (dy) (step 1915) to a new position that reestablishes a sharp image at the entrance 1917 to the optical fiber package 1909.

Figure 20:
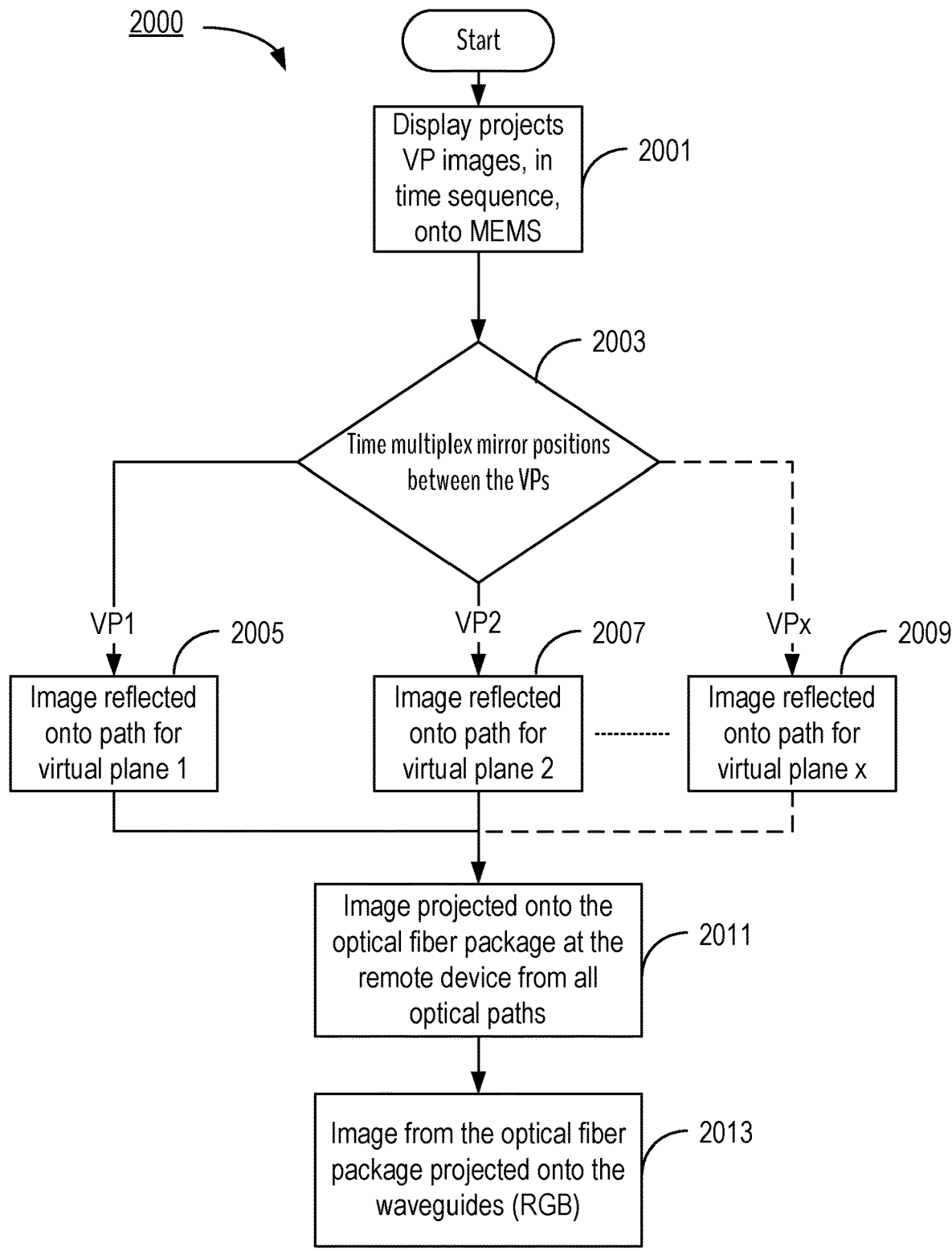
FIG. 20 is, in some respects, a flowchart of actions performed in some exemplary embodiments that utilize time multiplexing to display multiple virtual plane images.

To further facilitate an understanding of various aspects of the technology, FIG. 20 is, in some respects, a flowchart 2000 of actions associated with a remote device in accordance with a number of the above-described embodiments that utilize time division multiplexing. In other respects, the blocks depicted in FIG. 20 can also represent means (e.g., processing means) for carrying out the described actions.

Initially, an image generator projects virtual plane images, in time sequence, onto an electro-mechanical mirror array (step 2001). The mirror is then controlled to sequentially move into different positions (step 2003) that reflect each sequentially presented image onto a different path. Thus, for some arbitrary number (x) of virtual planes to be shown to a user, a first image is reflected onto a first optical path associated with a first virtual plane (step 2005), a second image is reflected onto a second optical path associated with a second virtual plane (step 2007), and so on until an $x^{th}$ image is reflected onto an $x^{th}$ optical path associated with an $x^{th}$ virtual plane (step 2009).

At the end of each optical path, the image is projected onto an optical fiber package (step 2011). The optical fiber then guides the image onto a set of see-through waveguides that are configured to display the number of optical wavelength components (e.g., three in the case of RGB images) (step 2013). The user is able to see the image by looking through the see-through waveguides.

Figure 21:
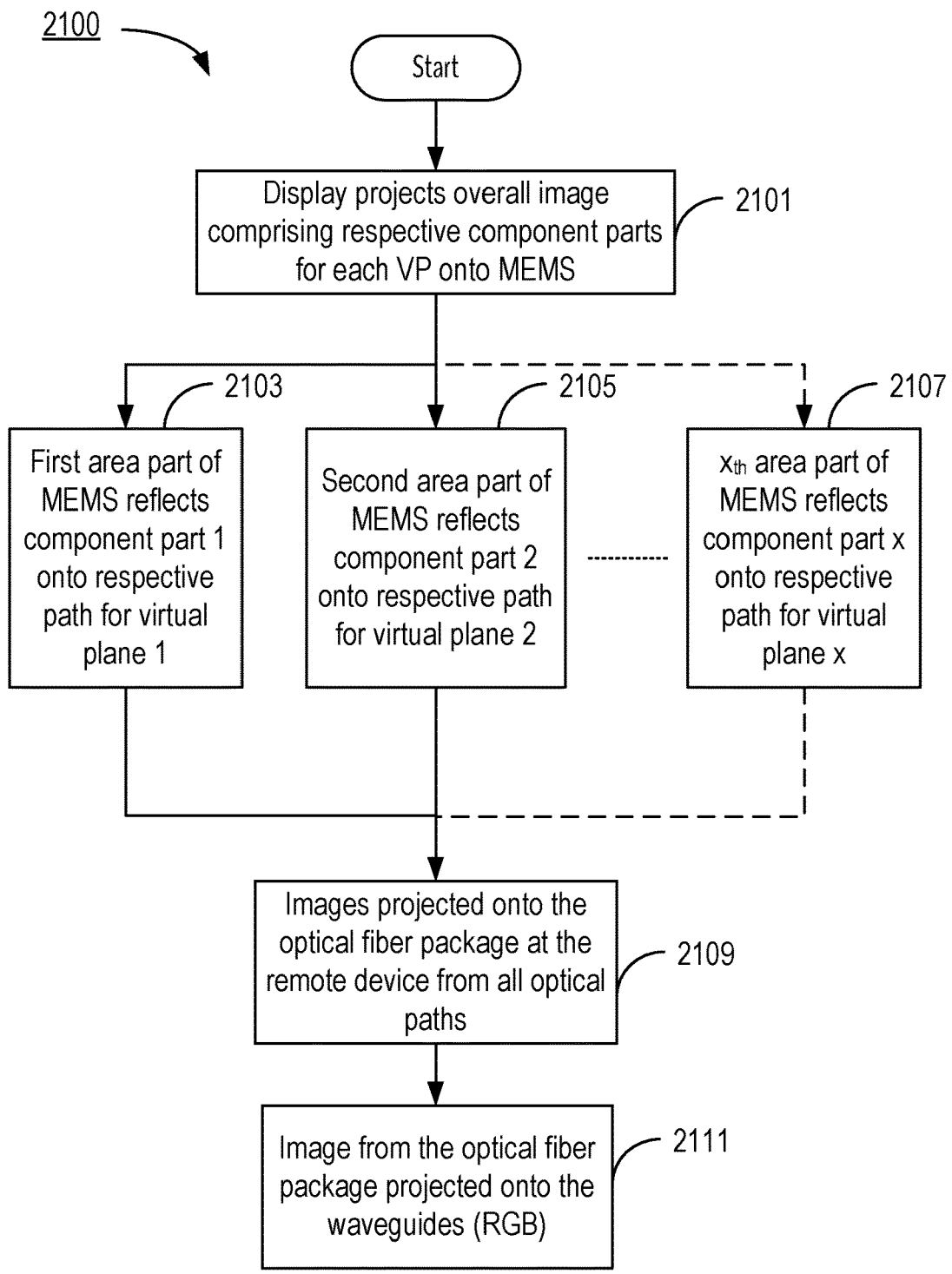
FIG. 21 is, in some respects, a flowchart of actions performed in some exemplary embodiments that utilize pixel resolution division to display multiple virtual plane images.

To further facilitate an understanding of other aspects of the technology, FIG. 21 is, in some respects, a flowchart 2100 of actions associated with a remote device in accordance with a number of the above-described embodiments that utilize pixel resolution division. In other respects, the blocks depicted in FIG. 21 can also be considered to represent means (e.g., processing means) for carrying out the described actions.

Initially, a display generator projects (step 2101) an overall image onto an electro-mechanical mirror (e.g., MEMS), wherein the overall image comprises respective component parts for each virtual plane to be displayed.

Different area parts of the electro-mechanical mirror are concurrently controlled such that, for some number of virtual planes (x): a first area part of the electro-mechanical mirror reflects a first component part onto a respective first path for a first virtual plane (step 2103), a second area part of the electro-mechanical mirror reflects a second component part onto a respective second path for a second virtual plane (step 2105), and so on until an $x^{th}$ area part of the electro-mechanical mirror reflects an $x^{th}$ component part onto a respective $x^{th}$ path for an $x^{th}$ virtual plane (step 2107).

At the end of each optical path, the images are projected onto an optical fiber package (step 2109). The optical fiber then guides the image onto a set of see-through waveguides that are configured to display the number of optical wavelength components (e.g., three in the case of RGB images) (step 2111). The user is able to see the image by looking through the see-through waveguides.

Figure 22:
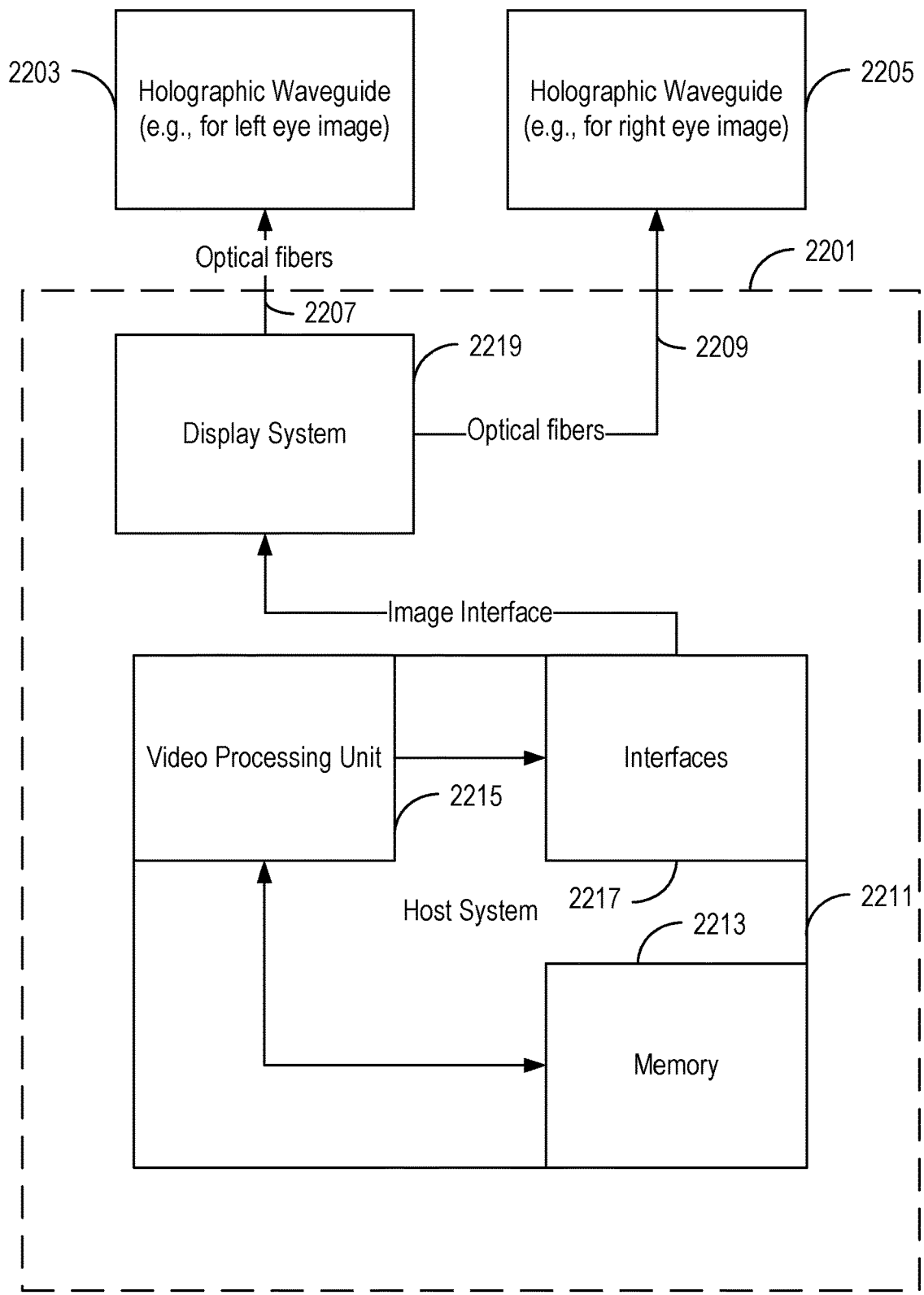
FIG. 22 is a block diagram of an arrangement in accordance with some but not necessarily all embodiments consistent with the invention.

FIG. 22 is a block diagram of an arrangement 2200 in accordance with some but not necessarily all embodiments consistent with the invention. The arrangement 2200 comprises a remote device 2201 coupled to respective left and right holographic waveguides 2203, 2205 by respective bundles of optical fibers 2207, 2209.

Images are generated by a host system 2211 in the remote device 2201. The host system 2211 comprises a memory 2213 coupled to a video processing unit 2215. The video processing unit 2215 utilizes data and instructions from the memory 2213 to generate images which are supplied to interfaces 2217 that transfer the generated images to a display system 2219.

The display system 2219 can be configured in accordance with principles disclosed with respect to any of the image directors described earlier in this document. Images generated by the display system 2219 for a user's left and right eyes are, as mentioned above, transferred to the holographic waveguides 2203, 2205 by the sets of optical fibers 2207, 2209.

Figure 23:
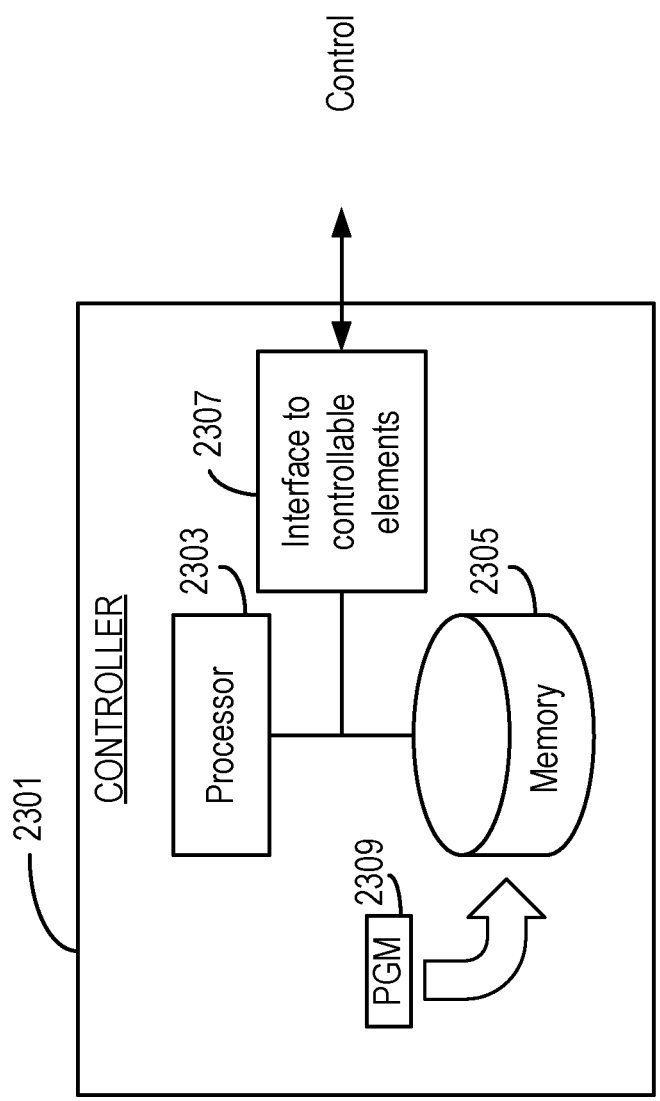
FIG. 23 illustrates an exemplary controller of a remote device in accordance with some but not necessarily all exemplary embodiments consistent with the invention.

Aspects of an exemplary controller as discussed in various embodiments are shown in FIG. 23, which illustrates an exemplary controller 2301 of a remote device in accordance with some but not necessarily all exemplary embodiments consistent with the invention. In particular, the controller 2301 includes circuitry configured to carry out any one or any combination of the various functions described above. Such circuitry could, for example, be entirely hard-wired circuitry (e.g., one or more Application Specific Integrated Circuits—"ASICs"). Depicted in the exemplary embodiment of FIG. 23, however, is programmable circuitry, comprising a processor 2303 coupled to one or more memory devices 2305 (e.g., Random Access Memory, Magnetic Disc Drives, Optical Disk Drives, Read Only Memory, etc.) and to an interface 2307 that enables bidirectional communication with other elements of the remote device (e.g., control interfaces of the one or more electro-mechanical mirrors). The memory device(s) 2305 store program means 2309 (e.g., a set of processor instructions) configured to cause the processor 2303 to control other remote device elements so as to carry out any of the aspects described above. The memory device(s) 2305 may also store data (not shown) representing various constant and variable parameters as may be needed by the processor 2303 and/or as may be generated when carrying out its functions such as those specified by the program means 2309.

The various embodiments provide a number of advantages over earlier technology. For example, aspects of exemplary embodiments enable XR glasses to be produced that are lighter weight than previously known in the art. Further, by separating heat generating elements from the XR glasses, the glasses become more comfortable to a user, and have a smaller form factor. Further, since fewer constraints need to be imposed on the wearable XR computing device that is placed in a pouch or worn on a belt, more power and computational resources can be added to the overall system without burdening the user.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

What is claimed is:

1. An apparatus that supplies multi-plane images for viewing by a user, the apparatus comprising:
   an image generator that generates a first image to be seen by the user as being a first distance from a user point of view, and a second image to be seen by the user as being a second distance from the user point of view, wherein the first image is comprised of a number of optical wavelength components, and the second image is comprised of the number of optical wavelength components;

an image director configured to direct the first image to traverse a first optical path to a first output port of the apparatus, and to direct the second image to traverse a second optical path to the first output port of the apparatus, wherein the first optical path corresponds to the first distance and the second optical path corresponds to the second distance, and wherein the first optical path and the second optical path have different lengths;

the first output port configured to connect to a first optical waveguide that is configured to guide the number of optical wavelength components to a user display device, wherein the image director comprises:

a first electro-mechanical mirror array located in the path of the first and second images supplied by the image generator; and a controller configured to cause the first electro-mechanical mirror array to direct the first image to the first optical path, and to cause the first electro-mechanical mirror array to direct the second image to the second optical path.

2. The apparatus of claim 1, further comprising:
the first optical waveguide coupled at a first end to the first output port; and
a see-through optical waveguide coupled to a second end of the first optical waveguide.

3. The apparatus of claim 1, wherein:
the image generator time multiplexes generation of the first and second images;
when the image generator is generating the first image, the controller causes the first electro-mechanical mirror array to direct the first image to the first optical path; and
when the image generator is generating the second image, the controller causes the first electro-mechanical mirror array to direct the second image to the second optical path.

4. The apparatus of claim 1, wherein:
the image generator simultaneously generates the first image and the second image as component parts of an overall image, wherein the first image is located within a first part of the overall image and the second image is located within a second part of the overall image;
the first electro-mechanical mirror array has a first area part and a second area part;
the first electro-mechanical mirror array is disposed within the apparatus such that the first area part of the first electro-mechanical mirror array is in the path of the first image output by the image generator;
the first electro-mechanical mirror array is disposed within the apparatus such that the second area part of the first electro-mechanical mirror array is in the path of the second image output by the image generator;
the controller causes the first area part of the first electro-mechanical mirror array to direct the first image to the first optical path; and
the controller causes the second area part of the first electro-mechanical mirror array to direct the second image to the second optical path.

5. The apparatus of claim 4, wherein:
the first and second images are configured for viewing by a first eye of the user;

the image generator generates a third image to be seen by the user as being the first distance from the user point of view, and a fourth image to be seen by the user as being the second distance from the user point of view, wherein the third image is comprised of the number of optical wavelength components, and the second image is comprised of the number of optical wavelength components, and wherein the third and fourth images are configured for viewing by a second eye of the user;

the image generator simultaneously generates the first image, the second image, the third image, and the fourth image as component parts of the overall image, wherein the third image is located within a third part of the overall image and the fourth image is located within a fourth part of the overall image;

the first electro-mechanical mirror array has a third area part and a fourth area part;

the first electro-mechanical mirror array is disposed within the apparatus such that the third area part of the first electro-mechanical mirror array is in the path of the third image output by the image generator;

the first electro-mechanical mirror array is disposed within the apparatus such that the fourth area part of the first electro-mechanical mirror array is in the path of the fourth image output by the image generator;

the controller causes the third area part of the first electro-mechanical mirror array to direct the third image to a third optical path that corresponds to the first distance; and the controller causes the fourth area part of the first electro-mechanical mirror array to direct the fourth image to a fourth optical path that corresponds to the second distance, wherein:

the first electro-mechanical mirror array is configured to direct the first image to the first output port via the first optical path, and to direct the third image to a second output port via the third optical path, wherein the second output port is configured to connect to a second optical waveguide that is configured to guide the number of optical wavelength components to the user display device; and the apparatus further comprises a second electro-mechanical mirror array configured to direct the second image to the first output port via the second optical path, and to direct the fourth image to the second output port via the fourth optical path.

6. An apparatus that supplies multi-plane images for viewing by a user, the apparatus comprising:

an image generator that generates a first image to be seen by the user as being a first distance from a user point of view, and a second image to be seen by the user as being a second distance from the user point of view, wherein the first image is comprised of a number of optical wavelength components, and the second image is comprised of the number of optical wavelength components;

an image director configured to direct the first image to traverse a first optical path to a first output port of the apparatus, and to direct the second image to traverse a second optical path to the first output port of the apparatus, wherein the first optical path corresponds to the first distance and the second optical path corresponds to the second distance, and wherein the first optical path and the second optical path have different lengths;

the first output port configured to connect to a first optical waveguide that is configured to guide the number of optical wavelength components to a user display device, wherein:

the first and second images are configured for viewing by a first eye of the user;

the image generator generates a third image to be seen by the user as being the first distance from the user point of view, and a fourth image to be seen by the user as being the second distance from the user point of view, wherein the third image is comprised of the number of optical wavelength components, and the fourth image is comprised of the number of optical wavelength components, and wherein the third and fourth images are configured for viewing by a second eye of the user;

the image director receives the first image and the second image from the image generator during a first period of time;

the image director receives the third image and the fourth image from the image generator during a second period of time;

the image director is configured to direct the first image to the first output port via the first optical path during the first period of time;

the image director is configured to direct the second image to the first output port via the second optical path during the first period of time;

the image director is configured to direct the third image to a second output port via a third optical path during the second period of time, wherein the third optical path corresponds to the first distance; and the image director is configured to direct the fourth image to the second output port via a fourth optical path during the second period of time, wherein the fourth optical path corresponds to the second distance.

7. The apparatus of claim 6, wherein:

the first period of time comprises a third period of time and a fourth period of time;

the second period of time comprises a fifth period of time and a sixth period of time;

when it is the third period of time, the image director causes the first image to be directed to the first output port via the first optical path;

when it is the fourth period of time, the image director causes the second image to be directed to the first output port via the second optical path;

when it is the fifth period of time, the image director causes the third image to be directed to the second output port via the third optical path; and when it is the sixth period of time, the image director causes the fourth image to be directed to the second output port via the fourth optical path.

8. The apparatus of claim 6, wherein the image director comprises a second electro-mechanical mirror array, disposed in the second optical path and the fourth optical path, and configured to:

direct the second image to the first output port during the first period of time;

direct the fourth image to the second output port during the second period of time.

9. The apparatus of claim 1, wherein the apparatus further comprises:

an autofocus lens arrangement that is dynamically controlled by the controller to cause the first distance to have a first optical length when a first control signal is generated, and to have a second optical length when a second control signal is generated, wherein the first and second optical lengths are different.

10. A method for supplying multi-plane images for viewing by a user, the method comprising:

generating a first image to be seen by the user as being a first distance from a user point of view, and a second image to be seen by the user as being a second distance from the user point of view, wherein the first image is comprised of a number of optical wavelength components, and the second image is comprised of the number of optical wavelength components;

directing the first image to traverse a first optical path to a first output port of an apparatus, and directing the second image to traverse a second optical path to the first output port of the apparatus, wherein the first optical path corresponds to the first distance and the second optical path corresponds to the second distance, and wherein the first optical path and the second optical path have different lengths, wherein the first output port is configured to connect to a first optical waveguide that is configured to guide the number of optical wavelength components to a user display device, and wherein directing the first image to traverse the first optical path to the first output port of the apparatus, and directing the second image to traverse the second optical path to the first output port of the apparatus comprises:

causing a first electro-mechanical mirror array to direct the first image to the first optical path, and causing the first electro-mechanical mirror array to direct the second image to the second optical path, wherein the first electro-mechanical mirror array is located in the path of the first and second images supplied by the image generator.

11. The method of claim 10, wherein generating the first image and the second image comprises:

time multiplexing generation of the first and second images;

when the image generator is generating the first image, causing the first electro-mechanical mirror array to direct the first image to the first optical path; and when the image generator is generating the second image, causing the first electro-mechanical mirror array to direct the second image to the second optical path.

12. The method of claim 10, wherein generating the first image and the second image comprises:

simultaneously generating the first image and the second image as component parts of an overall image, wherein the first image is located within a first part of the overall image and the second image is located within a second part of the overall image;

causing a first area part of the first electro-mechanical mirror array to direct the first image to the first optical path; and causing a second area part of the first electro-mechanical mirror array to direct the second image to the second optical path.

13. The method of claim 12, wherein:

the first and second images are configured for viewing by a first eye of the user; and the method comprises:

generating a third image to be seen by the user as being the first distance from the user point of view, and a fourth image to be seen by the user as being the second distance from the user point of view, wherein the third image is comprised of the number of optical wavelength components, and the second image is comprised of the number of optical wavelength components, and wherein the third and fourth images are configured for viewing by a second eye of the user;

simultaneously generating the first image, the second image, the third image, and the fourth image as component parts of the overall image, wherein the third image is located within a third part of the overall image and the fourth image is located within a fourth part of the overall image;

causing a third area part of the first electro-mechanical mirror array to direct the third image to a third optical path that corresponds to the first distance; and causing a fourth area part of the first electro-mechanical mirror array to direct the fourth image to a fourth optical path that corresponds to the second distance.

14. The method of claim 10, further comprising:

dynamically controlling an autofocus lens arrangement to cause the first distance to have a first optical length when a first control signal is generated, and to have a second optical length when a second control signal is generated, wherein the first and second optical lengths are different.

* * * * *